(12) United States Patent
Kim et al.

(10) Patent No.: US 10,346,704 B2
(45) Date of Patent: Jul. 9, 2019

(54) DISPLAY APPARATUS

(71) Applicant: LG ELECTRONICS INC., Seoul (KR)

(72) Inventors: Soomin Kim, Seoul (KR); Joowoo Lee, Seoul (KR); Jie Seol, Seoul (KR); Minsoo Byun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 65 days.

(21) Appl. No.: 15/660,357

(22) Filed: Jul. 26, 2017

(65) Prior Publication Data

US 2018/0032830 A1 Feb. 1, 2018

(30) Foreign Application Priority Data

Jul. 26, 2016 (KR) ........................ 10-2016-0094839

(51) Int. Cl.
| | |
|---|---|
| *G06K 9/20* | (2006.01) |
| *G06T 7/70* | (2017.01) |
| *G06K 9/32* | (2006.01) |
| *G06F 3/0482* | (2013.01) |
| *G06F 3/0484* | (2013.01) |
| *G06F 3/0488* | (2013.01) |
| *G06F 3/0481* | (2013.01) |

(52) U.S. Cl.
CPC ......... *G06K 9/2081* (2013.01); *G06F 3/0482* (2013.01); *G06F 3/04817* (2013.01); *G06F 3/04845* (2013.01); *G06F 3/04883* (2013.01); *G06K 9/2027* (2013.01); *G06K 9/3241* (2013.01); *G06T 7/70* (2017.01); *G06F 2203/04808* (2013.01); *G06T 2207/10016* (2013.01)

(58) Field of Classification Search
USPC ....................................................... 382/282
See application file for complete search history.

(56) References Cited

U.S. PATENT DOCUMENTS

| | | | |
|---|---|---|---|
| 9,824,453 B1 * | 11/2017 | Collins ................. | G06T 7/0075 |
| 2012/0229457 A1 * | 9/2012 | Hamagishi ......... | G02B 27/2214 |
| | | | 345/419 |
| 2015/0212702 A1 | 7/2015 | Kim et al. | |
| 2015/0371447 A1 * | 12/2015 | Yasutake ............... | G06T 19/006 |
| | | | 345/420 |

(Continued)

FOREIGN PATENT DOCUMENTS

JP          2005-136599 A         5/2005

OTHER PUBLICATIONS

Frakes, "The comic life," Macworld from IDG, URL: http://www.macworld.com/article/44456/2005/04/comiclife.html, Apr. 25, 2005, 2 pages.

*Primary Examiner* — Jerome Grant, II
(74) *Attorney, Agent, or Firm* — Birch, Stewart, Kolasch & Birch, LLP

(57) ABSTRACT

A display apparatus is disclosed. The display apparatus includes: a display unit configured to display an image; an input unit configured to receive an input from a user; and a controller configured to display a thumbnail image corresponding to a first region of an omnidirectionally captured image and acquire one or more images respectively corresponding to one or more regions which are different from the first region in the omnidirectionally captured image based on a type of the input.

17 Claims, 42 Drawing Sheets

(56) References Cited

U.S. PATENT DOCUMENTS

| | | | | |
|---|---|---|---|---|
| 2016/0353018 A1* | 12/2016 | Anderson | .......... | H04N 5/23222 |
| 2017/0195615 A1* | 7/2017 | Han | .................. | H04N 21/4316 |
| 2017/0322622 A1* | 11/2017 | Hong | ...................... | G06F 3/012 |
| 2018/0103196 A1* | 4/2018 | Lee | ........................ | H04N 5/247 |
| 2018/0311585 A1* | 11/2018 | Osman | .................. | A63F 13/655 |

* cited by examiner

DISPLAY APPARATUS

CROSS-REFERENCE TO RELATED APPLICATIONS

This application claims priority to Korean Patent Application No. 10-2016-0094839 filed on Jul. 26, 2016 in Korea, the entire contents of which is hereby incorporated by reference in its entirety.

BACKGROUND

Terminals may be generally classified as mobile/portable terminals or stationary terminals according to their mobility. Mobile terminals may also be classified as handheld terminals or vehicle mounted terminals according to whether or not a user can directly carry the terminal.

On the other hand, technologies capable of omnidirectionally capturing an image by using an omnidirectional camera and providing the omnidirectionally captured image to a user have been recently introduced. A representative example is a capturing device called a 360-degree camera, a mobile terminal that displays an image captured by the 360-degree camera, or the like.

Severe distortion occurs if the omnidirectionally captured image is displayed on one screen. Therefore, an image of a partial region of an omnidirectionally captured image is displayed, and then, an image of the other region is displayed according to a user manipulation.

Since the omnidirectionally captured image is obtained by capturing all regions having a spherical shape around a camera, the omnidirectionally captured image may include images unnecessary for a user as well as images that a user wants to treasure.

When the user wants to view an image of a desired region again, the user has the inconvenience of having to perform a manipulation so as to find the desired image.

Also, an image of a region that the user wants to treasure may be obtained by a capturing method or the like. However, when there are a lot of regions that the user wants to treasure, many manipulations are required.

SUMMARY

The present disclosure is directed to provide a display apparatus capable of acquiring and displaying general images of various regions of an omnidirectionally captured image.

In one embodiment, a display apparatus includes: a display unit configured to display an image; an input unit configured to receive an input from a user; and a controller configured to display a thumbnail image corresponding to a first region of an omnidirectionally captured image and acquire one or more images respectively corresponding to one or more regions which are different from the first region in the omnidirectionally captured image based on a type of the input.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein.

DETAILED DESCRIPTION OF THE EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
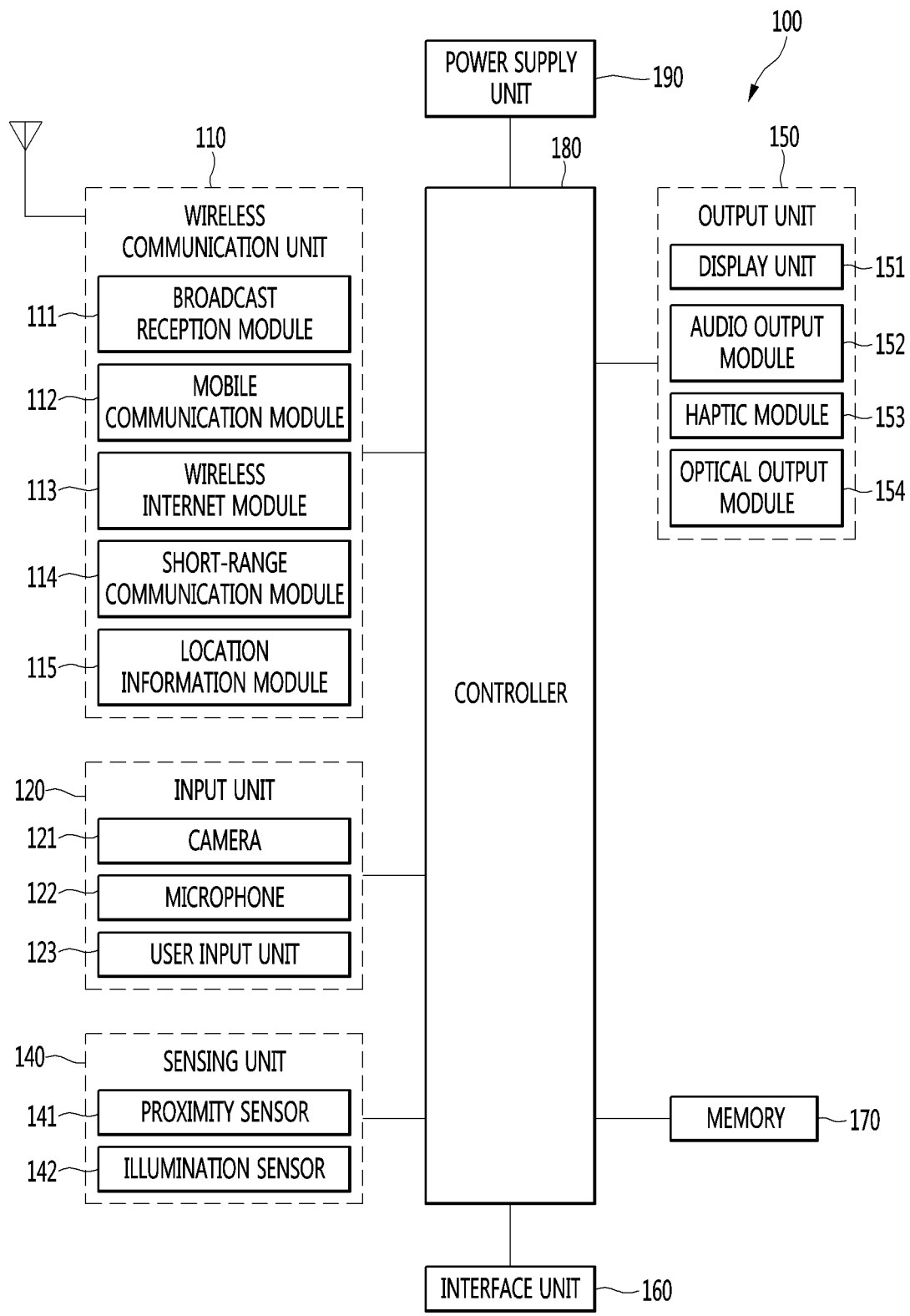
FIG. 1A is a block diagram of a mobile terminal in accordance with the present disclosure.
Figure 1B:
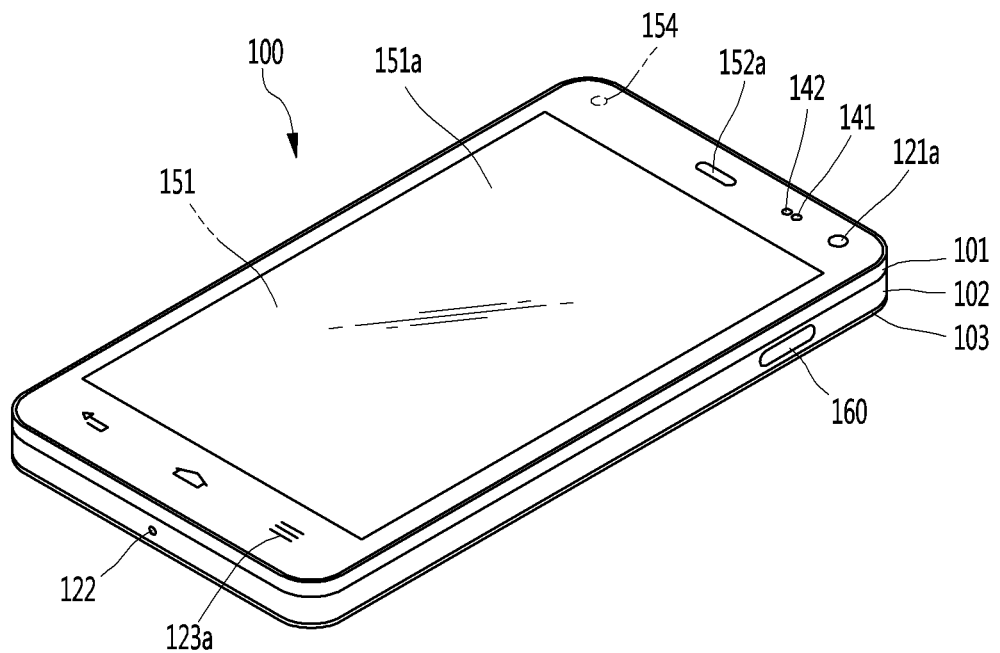
FIGS. 1B and 1C are conceptual views of one example of the mobile terminal, viewed from different directions.
Figure 1C:
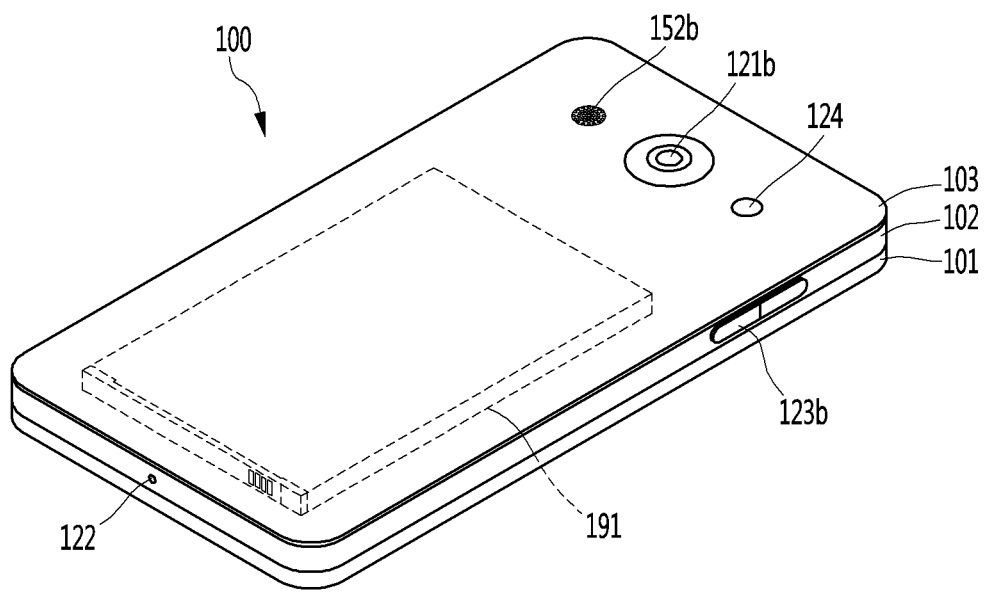

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be a server which generates and transmits a broadcast signal and/or broadcast associated information, or a server which receives a pre-generated broadcast signal and/or broadcast associated information, and sends such items to the mobile terminal.

The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000(Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 100. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sensing unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference therebetween by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal includes a display unit 151, a first and a second audio output modules 151a/151b, a proximity sensor 141, an illumination sensor 142, an optical output module 154, a first and a second cameras 121a/121b, a first and a second manipulation units 123a/123b, a microphone 122, interface unit 160 and the like.

It will be described for the mobile terminal as shown in FIGS. 1B and 1C. The display unit 151, the first audio output module 151a, the proximity sensor 141, an illumination sensor 142, the optical output module 154, the first camera 121a and the first manipulation unit 123a are arranged in front surface of the terminal body, the second manipulation unit 123b, the microphone 122 and interface unit 160 are arranged in side surface of the terminal body, and the second audio output modules 151b and the second camera 121b are arranged in rear surface of the terminal body.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3 dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output module 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

In the present disclosure, the term "memory 170" may also be referred as the "storage unit 170".

The input unit 120 of the mobile terminal 100 may include the sensing unit 140 and perform all functions performed by the sensing unit 140. For example, the input unit 120 may sense a user touch input.

Figure 2:
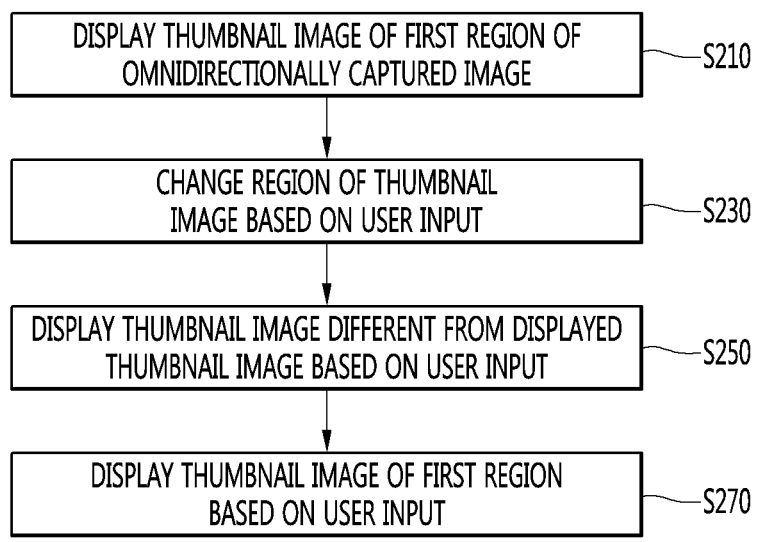
FIG. 2 is a flowchart of a displaying method of a display apparatus, in accordance with an embodiment of the present disclosure.

FIG. 2 is a flowchart of a displaying method of a display apparatus, in accordance with an embodiment of the present disclosure.

The displaying method of the display apparatus in accordance with the embodiment of the present disclosure may include: displaying an image corresponding to a first region of an omnidirectionally captured image (S210); changing a region of the displayed image based on an input received from a user (S230); displaying one or more images respectively corresponding to one or more regions different from the first region, based on an input received from the user (S250); and stopping the displaying of the one or more images and displaying a thumbnail image of the first region, based on an input received from the user (S270).

Figure 3:
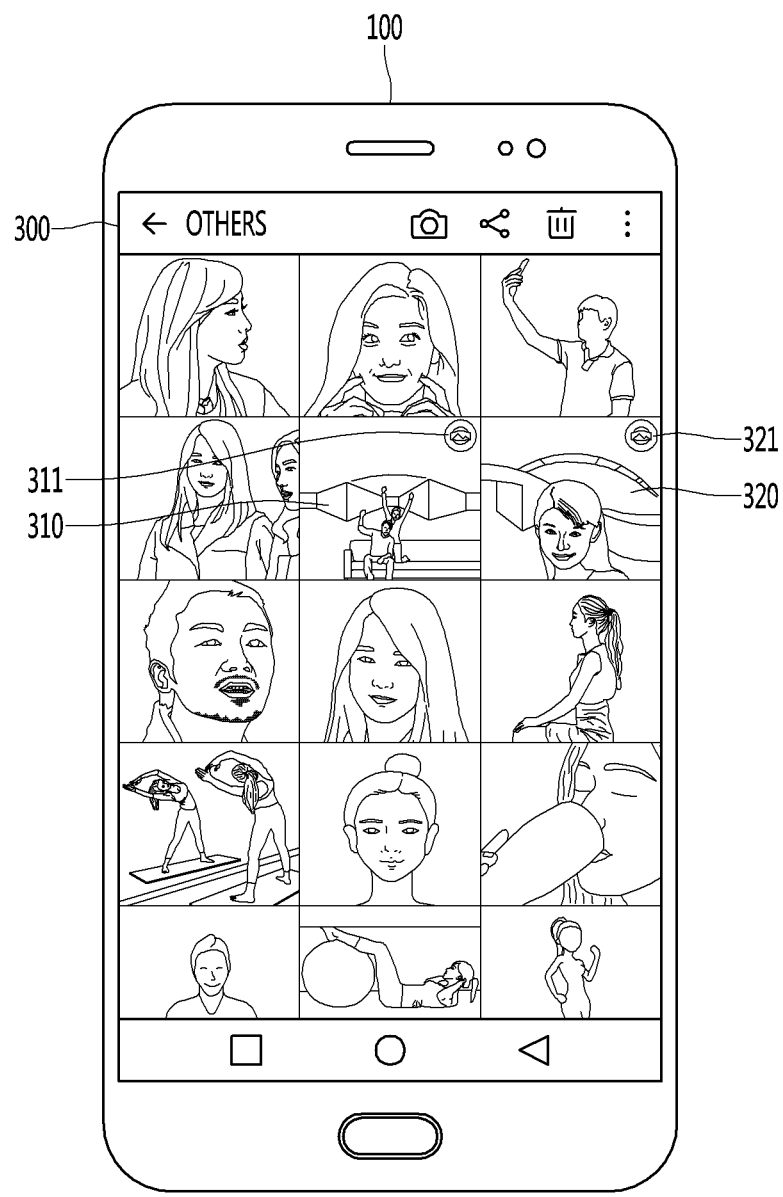
FIG. 3 is a view for describing a method of displaying an image corresponding to a first region of an omnidirectionally captured image, in accordance with an embodiment of the present disclosure.

FIG. 3 is a view for describing a method of displaying an image corresponding to a first region of an omnidirectionally captured image, in accordance with an embodiment of the present disclosure.

The omnidirectionally captured image may be an image omnidirectionally captured with respect to a specific point.

For example, when a virtual sphere is present and a specific point is the center of the virtual sphere, omnidirection may be all directions directed from the center of the virtual sphere toward the surface of the virtual sphere.

That is, when an image is captured using an omnidirectional camera such as a 360-degree camera, the omnidirectionally captured image 300 may be an image captured in all directions with respect to the camera. For example, the omnidirectionally captured image may be an image captured using a camera in which two fisheye lenses having an angle of view of 180 degrees are arranged in opposite directions.

In regard to the omnidirectionally captured image, the virtual sphere has been described above, but the present disclosure is not limited thereto.

Specifically, when an image within a specific angle of view is captured by using the omnidirectional camera, the omnidirectionally captured image may mean an image captured in all directions within the specific angle of view.

For example, when the capturing is performed by setting the angle of view of 180 degrees to the omnidirectional camera, the omnidirectionally captured image may be an image captured in all directions directed from the center of the virtual sphere toward the surface of the virtual sphere.

Also, the omnidirectionally captured image may be an image captured at a specific angle of view or more. For example, the omnidirectionally captured image may be an image captured at an angle of view of 90 degrees or more.

Also, the case where the image is captured using the omnidirectional camera has been described above, but the present disclosure is not limited thereto. For example, the present disclosure is also applied to a case where a plurality of images are captured using a general camera, instead of the omnidirectional camera, and the plurality of captured images are combined to generate an omnidirectionally captured image.

The controller 180 may display an image corresponding to the first region of the omnidirectionally captured image.

The first region may mean a region within a specific angle with respect to a capturing point. Also, the image corresponding to the first region of the omnidirectionally captured image may be an image within the first region in the omnidirectionally captured image. This will be described below in detail with reference to FIGS. 5 and 6.

On the other hand, the first region may be determined by the direction of the omnidirectional camera, the setting of the display apparatus 100, or other inputs.

For example, the first region may be a region within a specific angle from a frontward direction of the camera capturing the omnidirectionally captured image. As another example, the first region may be a region within a specific azimuth angle with respect to the South Pole or the North Pole. As another example, the first region may be a region within a specific angle set by a user.

On the other hand, the controller 180 may display a thumbnail image 310 corresponding to the first region. Specifically, the controller 180 may control the display unit 151 to display the thumbnail image corresponding to the first region.

On the other hand, the controller 180 may display a gallery 300. The gallery 300 may include at least one of a thumbnail image 310 corresponding to the first region of the omnidirectionally captured image and a thumbnail image of a general image. That is, the controller 180 may display both the thumbnail image 310 corresponding to the first region of the omnidirectionally captured image and the thumbnail image of the general image.

The general image may be an image that is not omnidirectionally captured and is captured by a general capturing method. For example, the general image may be an image captured using a telephoto lens, a standard lens, or a wide-angle lens.

Also, the general image may be an image displayed in a normal mode. The normal mode may be a mode in which an entire region of a captured image is displayed. The omnidirectionally captured image may be an image displayed in an omnidirectional display mode. The omnidirectional display mode may be a mode in which an image of a partial region of an omnidirectionally captured image is displayed, and then, an image of the other region is displayed according to a user manipulation.

Also, the general image may be an image captured at a specific angle of view or less. For example, the general image may be an image captured at an angle of view of 90 degrees or less.

Also, the general image may be a part of an omnidirectionally captured image. Specifically, the general image may be an image that is within a specific angle range in an omnidirectionally captured image. For example, when an image having an angle of view of 45 degrees is acquired by dividing an omnidirectionally captured image having an angle of view of 360 degrees, the general image may be an image that is within an angle range of 45 degrees acquired from the image captured at an angle of view of 360 degrees.

On the other hand, the controller 180 may display an icon 311 indicating that the thumbnail image 310 corresponding to the first region of the omnidirectionally captured image is the omnidirectionally captured image, together with the thumbnail image 310 corresponding to the first region of the omnidirectionally captured image.

Also, the controller 180 may display a thumbnail image 320 corresponding to a specific region of a second image omnidirectionally captured, together with the thumbnail image 310 corresponding to the first region of the omnidirectionally captured image, and may display an icon 321 indicating that the thumbnail image 320 corresponding to the specific region of the second image is the omnidirectionally captured image.

Figure 4:
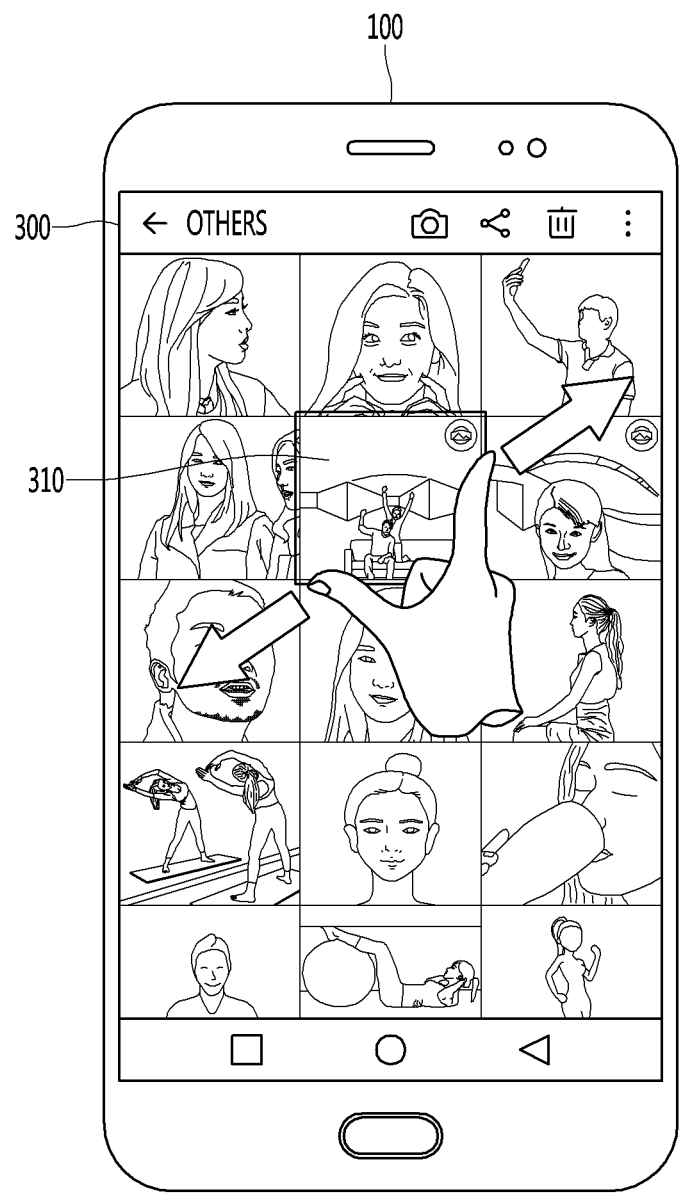
FIG. 4 is a view for describing a method of receiving an input for acquiring an image of a region different from the first region.

FIG. 4 is a view for describing a method of receiving an input for acquiring an image of a region different from the first region.

The controller 180 may receive an input for acquiring one or more images respectively corresponding to one or more regions different from the first region of the omnidirectionally captured image.

Specifically, in a state in which the thumbnail image 310 corresponding to the first region in the omnidirectionally captured image is displayed, the controller 180 may receive, through the input unit 120, the input for acquiring the one or more images respectively corresponding to the one or more regions different from the first region of the omnidirectionally captured image.

The input for acquiring the one or more images respectively corresponding to the one or more regions different from the first region of the omnidirectionally captured image may distinguish from an input for displaying the omnidirectionally captured image in an omnidirectional display mode.

For example, the input for displaying the omnidirectionally captured image in the omnidirectional display mode may be an input of touching the thumbnail image 310 corresponding to the first region, and the input for acquiring the one or more images respectively corresponding to the one or more regions different from the first region of the omnidirectionally captured image may be a pinch-out input as shown in FIG. 4.

Figure 5:
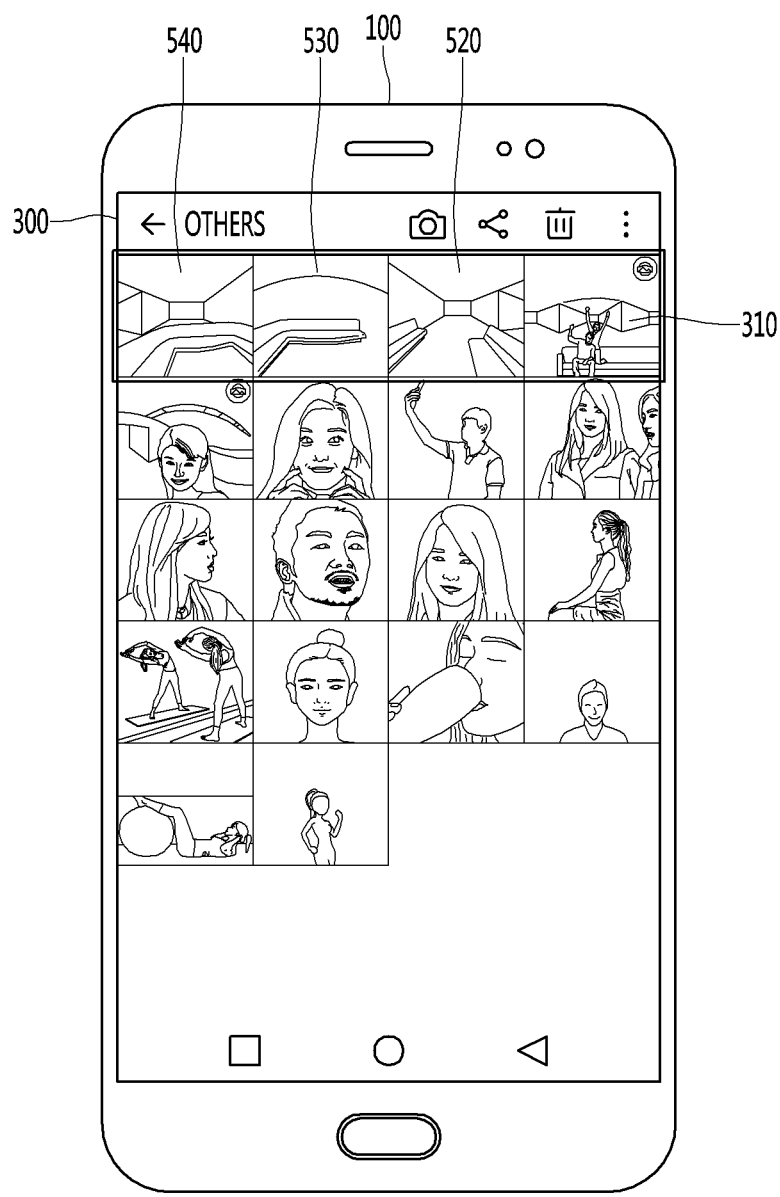
FIG. 5 is a view for describing a method of acquiring an image of a region different from the first region, in accordance with an embodiment of the present disclosure.

FIG. 5 is a view for describing a method of acquiring an image of a region different from the first region, in accordance with an embodiment of the present disclosure.

The controller 180 may acquire one or more images respectively corresponding to one or more regions different from the first region of the omnidirectionally captured image.

Specifically, when the input described with reference to FIG. 4 is received from the user, the controller 180 may acquire one or more general images respectively corresponding to the one or more regions different from the first region of the omnidirectionally captured image. The general image may be an image that is within a specific angle range in an omnidirectionally captured image. For example, the general image may be an image within a 90-degree angle range acquired from the omnidirectionally captured image (an angle of view of 360 degrees).

On the other hand, when the one or more images respectively corresponding to the one or more regions different from the first region of the omnidirectionally captured image are acquired, the controller 180 may store the one or more images in the storage unit 170.

Also, when the one or more images respectively corresponding to the one or more regions different from the first region of the omnidirectionally captured image are acquired, the controller 180 may display the one or more images. The displayed image may be one or more thumbnail images 520, 530, and 540 respectively corresponding to the one or more regions different from the first region of the omnidirectionally captured image.

Also, when an input is received in a state in which the thumbnail image corresponding to the first region of the omnidirectionally captured image is displayed, the controller 180 may acquire an image corresponding to the first region. Also, when the image corresponding to the first region is acquired, the controller 180 may store the image corresponding to the first region in the storage unit 170. The image corresponding to the first region may be a general image.

Also, when the input described with reference to FIG. 4 is received from the user, the controller 180 may additionally display, on the gallery 300, the one or more thumbnail images 520, 530, and 540 respectively corresponding to the one or more regions different from the first region of the omnidirectionally captured image.

Specifically, the controller 180 may display, on the gallery 300, the one or more thumbnail images 520, 530, and 540 respectively corresponding to the one or more regions different from the first region of the omnidirectionally captured image, together with the thumbnail image 510 corresponding to the first region. Also, the controller 180 may display the one or more thumbnail images 520, 530, and 540 respectively corresponding to the one or more regions different from the first region of the omnidirectionally captured image, together with the thumbnail image of the general image having been displayed in FIG. 4.

On the other hand, the plurality of thumbnail images 510, 520, 530, and 540 of the omnidirectionally captured image may be preferentially aligned within the gallery 300.

For example, when it is assumed that one or more images within the gallery 300 are aligned from top to bottom, the image 510 corresponding to the first region is displayed at the second row among a plurality of rows dividing the gallery 300 in FIG. 4. However, when the input described with reference to FIG. 4 is received from the user, the controller 180 may display the thumbnail image 510 corresponding to the first region of the omnidirectionally captured image and the one or more thumbnail images 520, 530, and 540 respectively corresponding to the one or more regions different from the first region while arranging them at the first row. Also, when the thumbnail image 510 corresponding to the first region of the omnidirectionally captured image and the one or more thumbnail images 520, 530, and 540 respectively corresponding to the one or more regions different from the first region cannot be all displayed at one row, some of the thumbnail image 510 corresponding to the first region of the omnidirectionally captured image and the one or more thumbnail images 520, 530, and 540 respectively corresponding to the one or more regions different from the first region are displayed at the first row, and the others may be displayed while being aligned from left to right of the second row.

As such, when the plurality of thumbnail images 510, 520, 530, and 540 of the omnidirectionally captured image are displayed, the plurality of thumbnail images 510, 520, 530, and 540 of the omnidirectionally captured image are preferentially aligned. Therefore, the user can easily recognize that the plurality of thumbnail images 510, 520, 530, and 540 are images acquired from one omnidirectionally captured image, and the user can easily distinguish the general image from the partial image of the omnidirectionally captured image.

In the following, the thumbnail image corresponding to the first region of the omnidirectionally captured image is referred to as a first thumbnail image 310, and the one or more thumbnail images 520, 530, and 540 respectively corresponding to the one or more regions different from the first region of the omnidirectionally captured image are respectively referred to as a second thumbnail image 520, a third thumbnail image 530, and a fourth thumbnail image 540.

The first region of the omnidirectionally captured image and the one or more other regions will be described in detail with reference to FIGS. 6A to 6D.

FIGS. 6A to 6D are views for describing the first region and regions different from the first region, in accordance with an embodiment of the present disclosure.

Figure 6A:
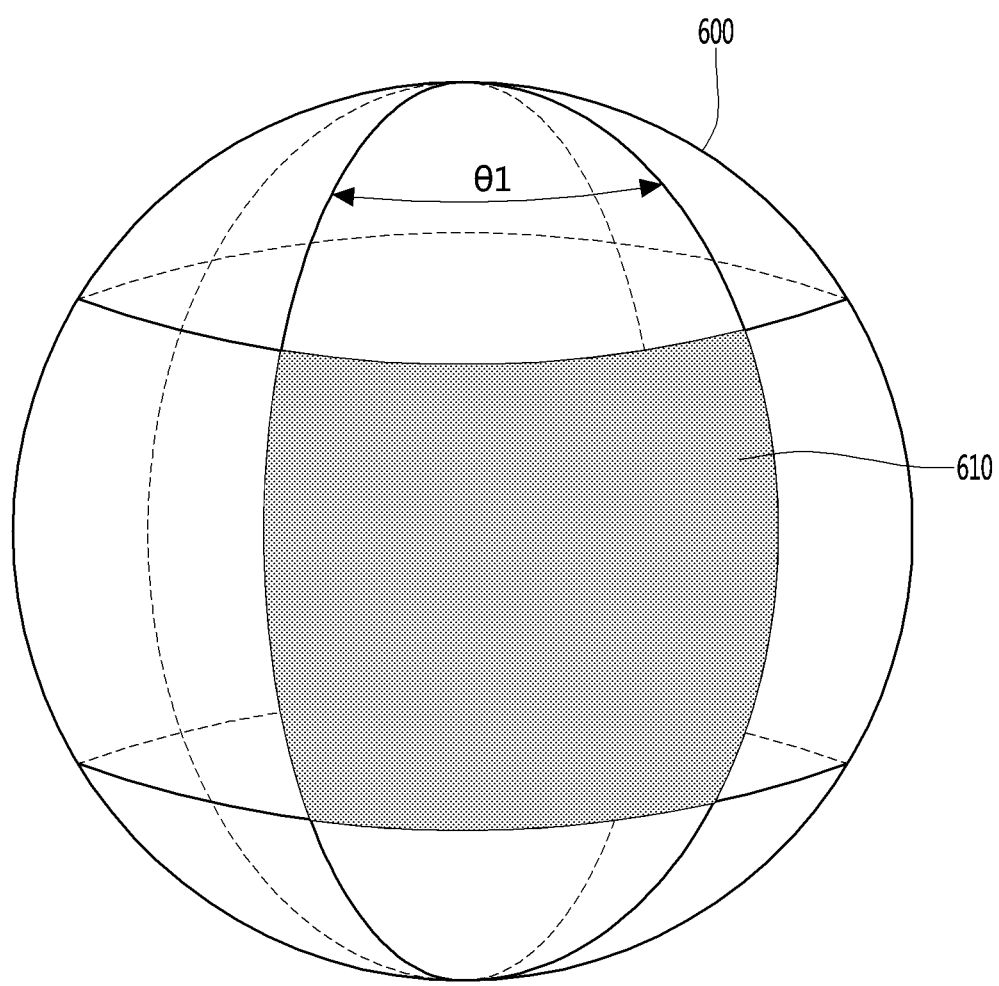
FIGS. 6A to 6D are views for describing the first region and a region different from the first region, in accordance with an embodiment of the present disclosure.

As shown in FIG. 6A, the first region 610 may be a partial region of an entire region 600 of the omnidirectionally captured image.

Also, the first region 610 may mean a region within a first angle with respect to a capturing point. For example, in a virtual sphere with a capturing point as a center, the first region 610 may be a region that is within −45 degrees to 45 degrees horizontally (left and right) and −45 degrees to 45 degrees vertically (up and down) with respect to the capturing point.

However, the first region is not limited to a region within a specific angle and may be variously changed according to a setting. For example, in a line having a vertical (up/down) angle range of 0 degrees, a horizontal angle range of the first region may be −50 degrees to 50 degrees, and in a line having a vertical angle range of 30 degrees, a horizontal angle range of the first region may be −30 degrees to 30 degrees.

On the other hand, the first thumbnail image 310 in FIG. 5 may be an image corresponding to the first region 610 in the entire region 600 of the omnidirectionally captured image in FIG. 6A. Specifically, the first thumbnail image 310 may be an image within the first region 610 in the entire region 600 of the omnidirectionally captured image.

Figure 6B:
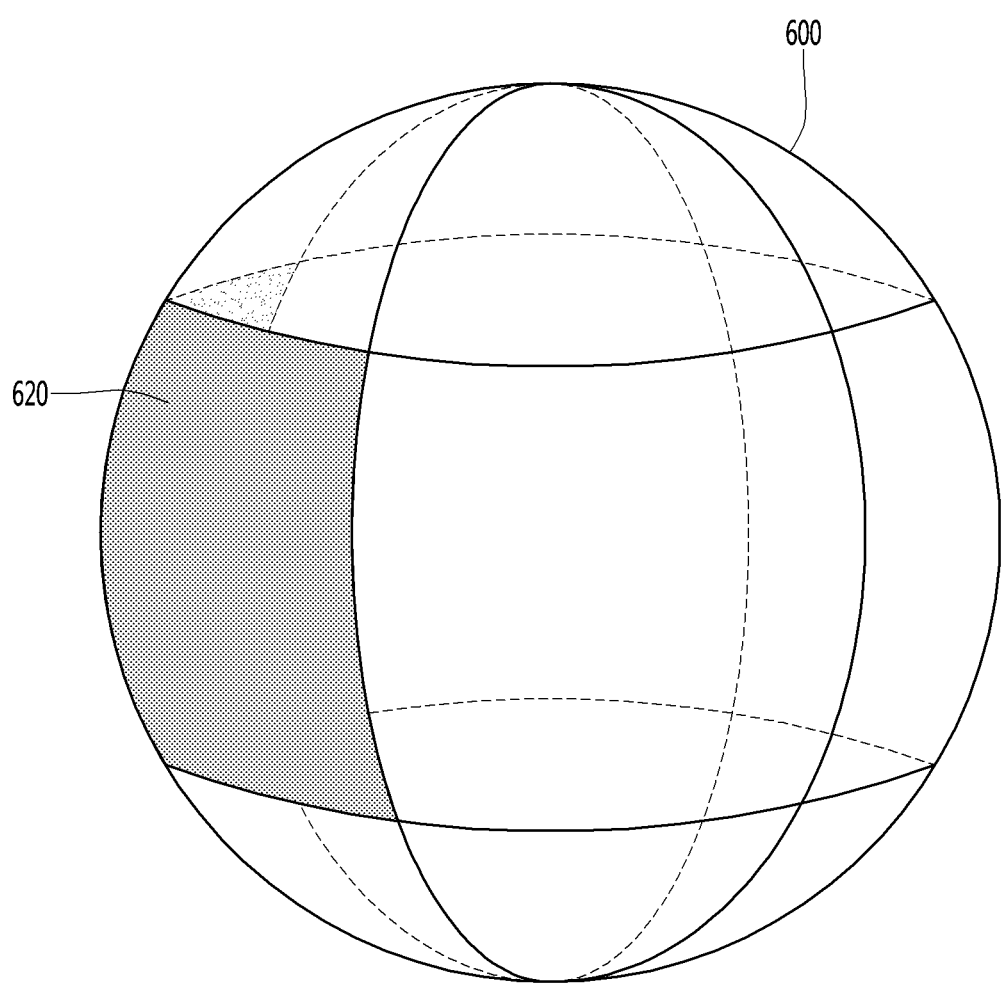
Figure 6C:
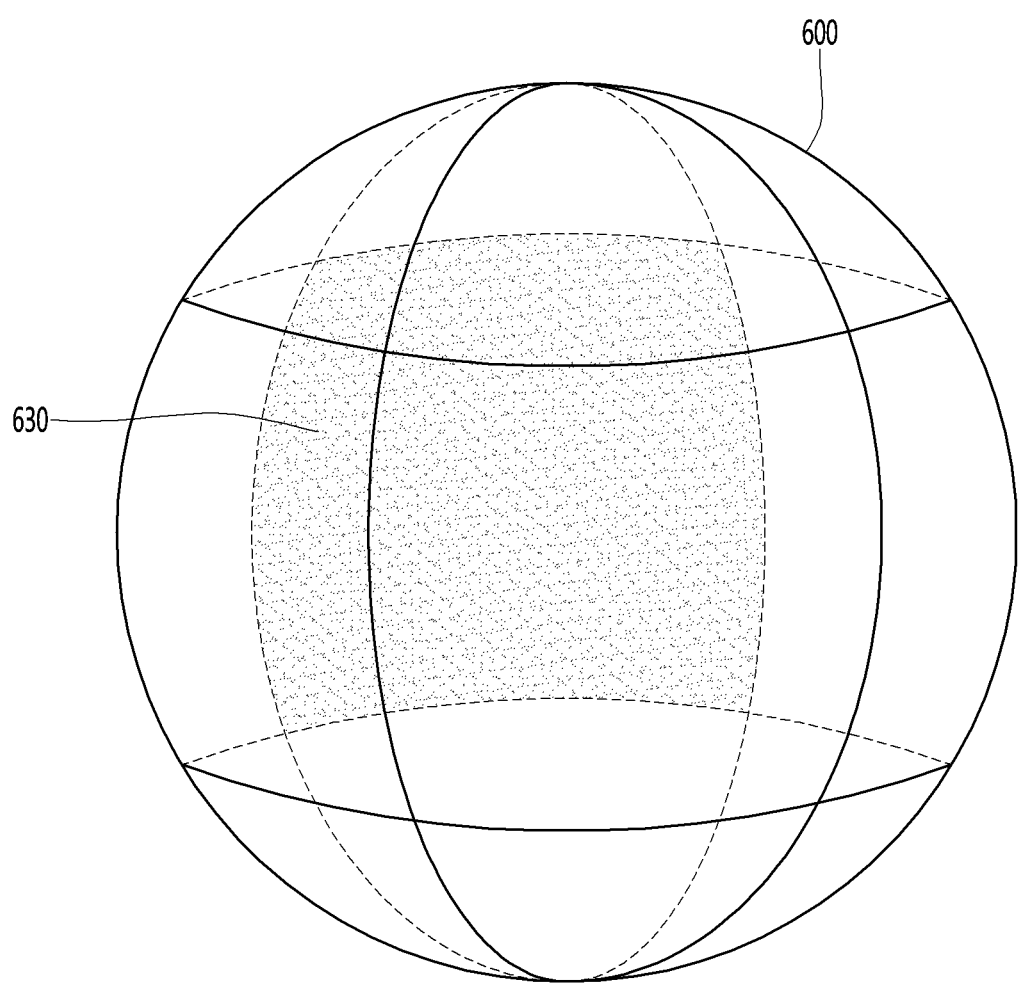
Figure 6D:
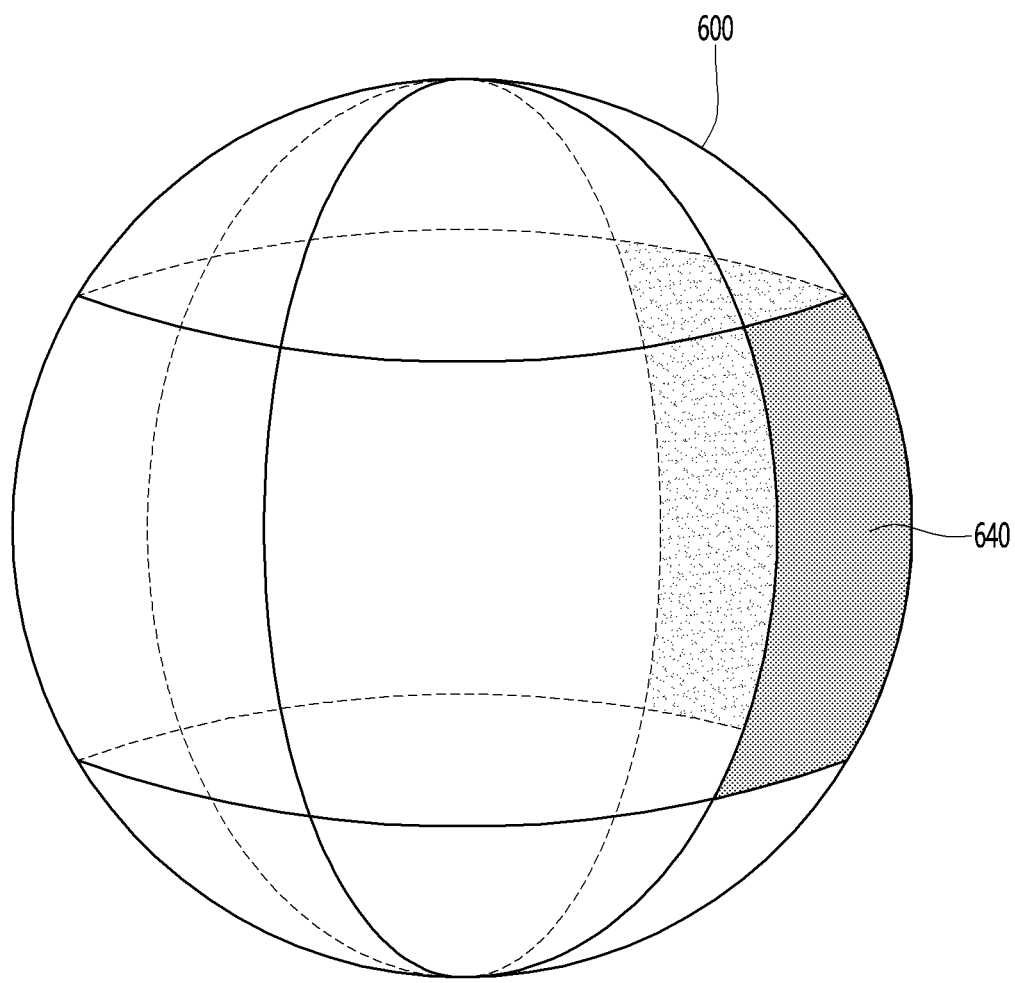

Referring to FIGS. 6B to 6D, the controller 180 may display one or more thumbnail images 520, 530, and 540 respectively corresponding to one or more regions 620, 630, and 640 different from the first region 610.

The second region 620 shown in FIG. 6B may be a region different from the first region 610. Specifically, the second region 620 may mean a region within a second angle different from the first angle with respect to the capturing point. For example, in the virtual sphere with the capturing point as the center, the second region 620 may be a region within −45 degrees to 135 degrees horizontally and −45 degrees to 45 degrees vertically with respect to the capturing point.

On the other hand, the second thumbnail image 520 in FIG. 5 may be an image corresponding to the second region 620 in the entire region 600 of the omnidirectionally captured image in FIG. 6A. Specifically, the second thumbnail image 520 may be an image within the second region 620 in the entire region 600 of the omnidirectionally captured image.

The third region 630 shown in FIG. 6C may be a region different from the first region 610 and the second region 620. Specifically, the third region 630 may mean a region within a third angle different from the first angle and the second angle with respect to the capturing point. For example, in the virtual sphere with the capturing point as the center, the third region 630 may be a region that is within 135 degrees to 225 degrees horizontally and −45 degrees to 45 degrees vertically with respect to the capturing point.

On the other hand, the third thumbnail image 530 in FIG. 5 may be an image corresponding to the third region 630 in the entire region 600 of the omnidirectionally captured image in FIG. 6C. Specifically, the third thumbnail image 530 may be an image within the third region 630 in the entire region 600 of the omnidirectionally captured image.

The fourth region 640 shown in FIG. 6D may be a region different from the first region 610, the second region 620, and the third region 630. Specifically, the fourth region 640 may mean a region within a fourth angle different from the first angle, the second angle, and the third angle with respect to the capturing point. For example, in the virtual sphere with the capturing point as the center, the fourth region 640 may be a region that is within 225 degrees to 315 degrees horizontally and −45 degrees to 45 degrees vertically with respect to the capturing point.

On the other hand, the fourth thumbnail image 540 in FIG. 5 may be an image corresponding to the fourth region 640 in the entire region 600 of the omnidirectionally captured image in FIG. 6D. Specifically, the fourth thumbnail image 540 may be an image within the fourth region 640 in the entire region 600 of the omnidirectionally captured image.

On the other hand, the region 310 corresponding to the first region 610 may be an image that represents a specific angle range in an omnidirectionally captured image. Also, the one or more images respectively corresponding to the one or more regions 620, 630, and 640 different from the first region 610 of the omnidirectionally captured image may be images that are in a range of the same angle as the specific angle.

For example, in the virtual sphere with the capturing point as the center, the image 310 corresponding to the first region 610 may be an image that is within a specific angle range (−45 degrees to 45 degrees horizontally and −45 degrees to 45 degrees vertically) with respect to the capturing point. In this case, the specific angle may be 90 degrees horizontally and 90 degrees vertically.

In this case, in the virtual sphere with the capturing point as the center, the one or more images respectively corresponding to one or more regions 620, 630, and 640 different from the first region 610 of the omnidirectionally captured image may be images that are in a range of the same angle as the specific angle (90 degrees horizontally and 90 degrees vertically).

For example, the second image may be an image that is within a range (45 degrees to 135 degrees horizontally and −45 degrees to 45 degrees vertically) of the same angle as the specific angle (90 degrees horizontally and 90 degrees vertically). As another example, the third image may be an image that is within a range (135 degrees to 225 degrees horizontally and −45 degrees to 45 degrees vertically) of the same angle as the specific angle (90 degrees horizontally and 90 degrees vertically). As another example, the fourth image may be an image that is within a range (225 degrees to 315 degrees horizontally and −45 degrees to 45 degrees vertically) of the same angle as the specific angle (90 degrees horizontally and 90 degrees vertically).

On the other hand, the controller 180 may acquire the one or more images respectively corresponding to the one or more regions 620, 630, and 640 different from the first region 610 of the omnidirectionally captured image. The angle range of the one or more images may depend on a speed of an input.

Specifically, the input received from the user may be a touch input. When the touch input is received, the controller 180 may acquire information on the speed of the touch input.

Also, when the information on the speed of the touch input is acquired, the controller 180 may acquire one or more images of the angle range corresponding to the speed of the touch input.

For example, in the virtual sphere with the capturing point as the center, the image 310 corresponding to the first region 610 may be an image that is within a specific angle range (−45 degrees to 45 degrees horizontally and −45 degrees to 45 degrees vertically) with respect to the capturing point. In this case, the specific angle may be 90 degrees horizontally and 90 degrees vertically.

In this case, when the speed of the touch input is a first speed, the controller 180 may acquire an image of a range (90 degrees horizontally and 90 degrees vertically) of the same angle as the specific angle (90 degrees horizontally and 90 degrees vertically). That is, when the speed of the touch input is the first speed, the controller 180 may acquire a first image (angle range: −45 degrees to 45 degrees horizontally and −45 degrees to 45 degrees vertically), a second image (angle range: degrees to 135 degrees horizontally and −45 degrees to 45 degrees vertically), a third image (angle range:

135 degrees to 225 degrees horizontally and −45 degrees to 45 degrees vertically), and a fourth image (angle range: 225 degrees to 315 degrees horizontally and −45 degrees to 45 degrees vertically).

Also, when the speed of the touch input is a second speed higher than the first speed, the controller 180 may acquire and display an image of a range (e.g., 120 degrees horizontally and 90 degrees vertically) greater than the specific angle (90 degrees horizontally and 90 degrees vertically). For example, when the speed of the touch input is the second speed, the controller 180 may acquire a first image (angle range: −60 degrees to 60 degrees horizontally and −45 degrees to 45 degrees vertically), a second image (angle range: 60 degrees to 180 degrees horizontally and −45 degrees to 45 degrees vertically), and a third image (angle range: 180 degrees to 300 degrees horizontally and −45 degrees to 45 degrees vertically).

Also, when the speed of the touch input is a third speed lower than the first speed, the controller 180 may acquire and display an image of a range (e.g., 60 degrees horizontally and 90 degrees vertically) smaller than the specific angle (90 degrees horizontally and 90 degrees vertically).

That is, in accordance with the present disclosure, it is possible to provide an environment that allows the user to easily generate an image having various angle ranges. For example, the user can check general images having various sizes while performing a touch input at various speeds, and can select and store general images that the user wants to treasure.

In particular, in the case of the omnidirectionally captured image, the region included in the image increases as the angle increases, but distortion becomes severe. As the angle decreases, distortion is reduced, but the region included in the image decreases. In this case, the user can select a desired image by checking thumbnail images having various sizes while performing the touch input at various speeds.

On the other hand, in the present embodiment, the first region 610, the second region 620, the third region 630, and the fourth region 640 have described as being formed within the same vertical angle range (−45 degrees to 45 degrees vertically), but the present disclosure is not limited thereto. For example, the first region 610, the second region 620, the third region 630, and the fourth region 640 may be formed within the same horizontal angle. This will be described below in detail with reference to FIG. 12.

Also, the present disclosure is not limited to a case where the first region 610, the second region 620, the third region 630, and the fourth region 640 are formed within the same vertical or horizontal angle, and the first region 610, the second region 620, the third region 630, and the fourth region 640 may be formed in a part of the entire region 600 of the omnidirectionally captured image.

On the other hand, some of one or more regions 610, 620, 630, and 640 may overlap each other. For example, when the first region 610 is a region that is within −45 degrees to 45 degrees horizontally and −45 degrees to 45 degrees vertically with respect to the capturing point, the second region 620 may be a region that is within 30 degrees to 120 degrees horizontally and −45 degrees to 45 degrees vertically with respect to the capturing point.

Also, in FIGS. 6A and 6B, the regions 610, 620, 630, and 640 have been described as having the same size, but the present disclosure is not limited thereto. For example, when the first region 610 is a region that is within −45 degrees to 45 degrees horizontally and −45 degrees to 45 degrees vertically with respect to the capturing point, the second region 620 may be a region that is within 45 degrees to 90 degrees horizontally and −22.5 degrees to 22.5 degrees vertically with respect to the capturing point.

Also, in FIGS. 6A and 6B, the regions 610, 620, 630, and 640 have been described as having the same vertical angle (−45 degrees to 45 degrees vertically), but the present disclosure is not limited thereto. For example, when the first region 610 is a region that is within −22.5 degrees to 22.5 degrees horizontally and −22.5 degrees to 22.5 degrees vertically with respect to the capturing point, the second region 620 may be a region that is within 67.5 degrees to 112.5 degrees horizontally and −22.5 degrees to 22.5 degrees vertically with respect to the capturing point, the third region 630 may be a region that is within 157.5 degrees to 202.5 degrees horizontally and −22.5 degrees to 22.5 degrees vertically with respect to the capturing point, and the fourth region 640 may be a region that is within 247.5 degrees to 292.5 degrees horizontally and −22.5 degrees to 22.5 degrees vertically with respect to the capturing point.

On the other hand, when an input for acquiring the one or more images respectively corresponding to one or more regions 620, 630, and 640 different from the first region 610 of the omnidirectionally captured image is received, the controller 180 may store one or more images 520, 530, and 540 in the storage unit 170.

Also, when an input 510 of selecting one of the plurality of thumbnail images 510, 520, 530, and 540 of the omnidirectionally captured image is received, the controller 180 may display an image corresponding to the selected thumbnail image.

Also, if an input for deleting a specific image among one or more images 520, 530, and 540, the controller 180 may delete the specific image from the storage unit 180 and stop the displaying of the thumbnail image corresponding to the specific image.

As such, in accordance with the present disclosure, the user can acquire the general images of various directions of the omnidirectionally captured image through a simple manipulation without any manipulation such as capturing after rotating the omnidirectionally captured image.

Also, in accordance with the present disclosure, the general images of various directions of the omnidirectionally captured image are displayed as a thumbnail image on one screen. Therefore, the user can view the general images of various directions at a glance, and can easily classify images that the user wants to treasure or images that the user wants to delete.

A method of acquiring a general image according to various user inputs will be described with reference to FIGS. 7 to 15.

Figure 7:
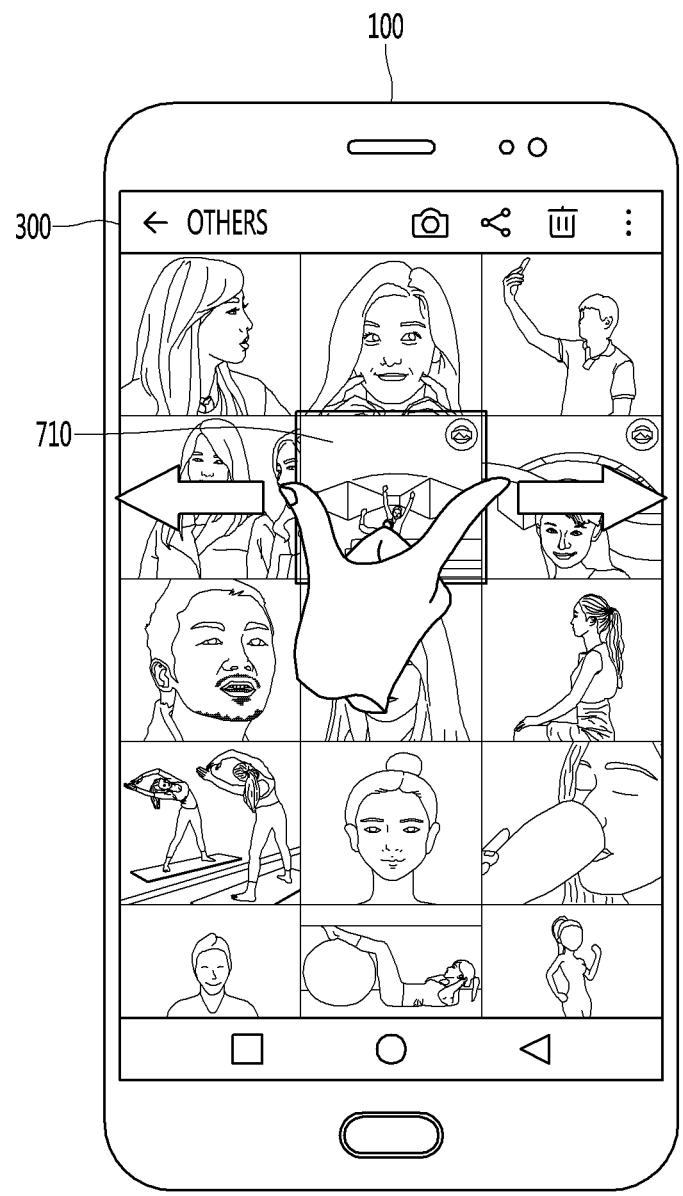
FIGS. 7 to 9 are views for describing an operating method when a first input is received, in accordance with an embodiment of the present disclosure.
Figure 8:
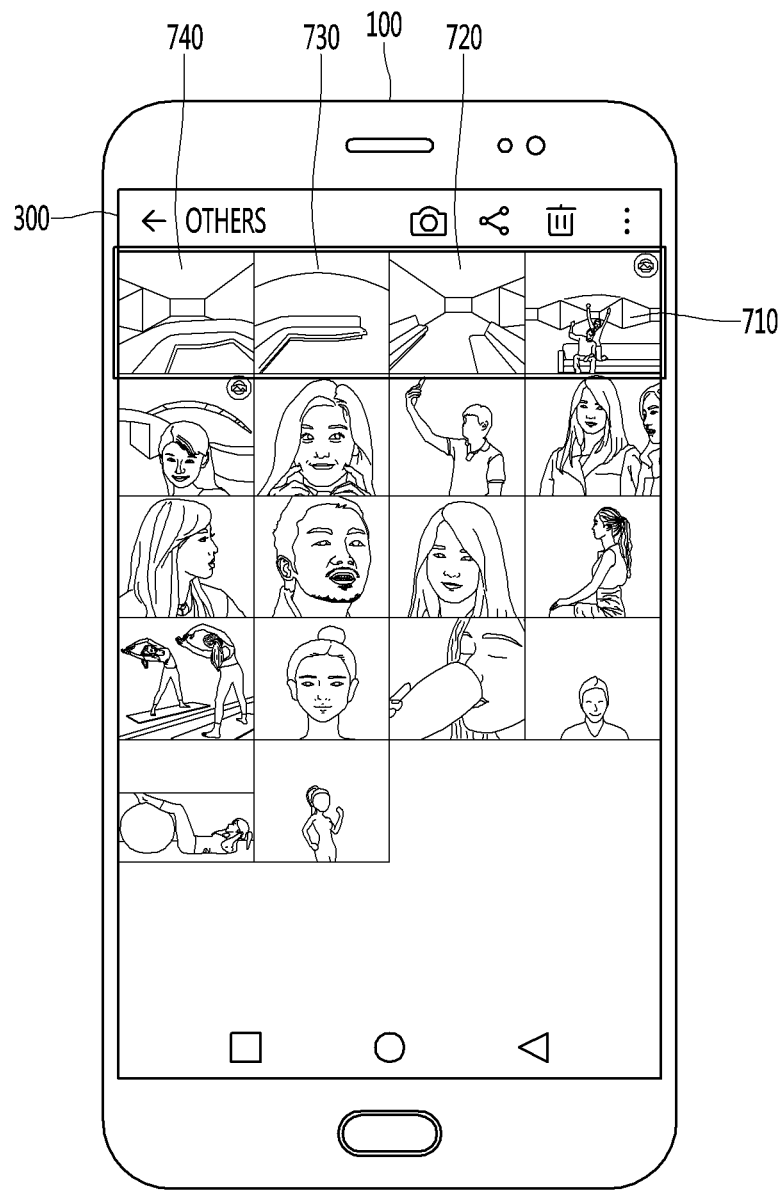
Figure 9:
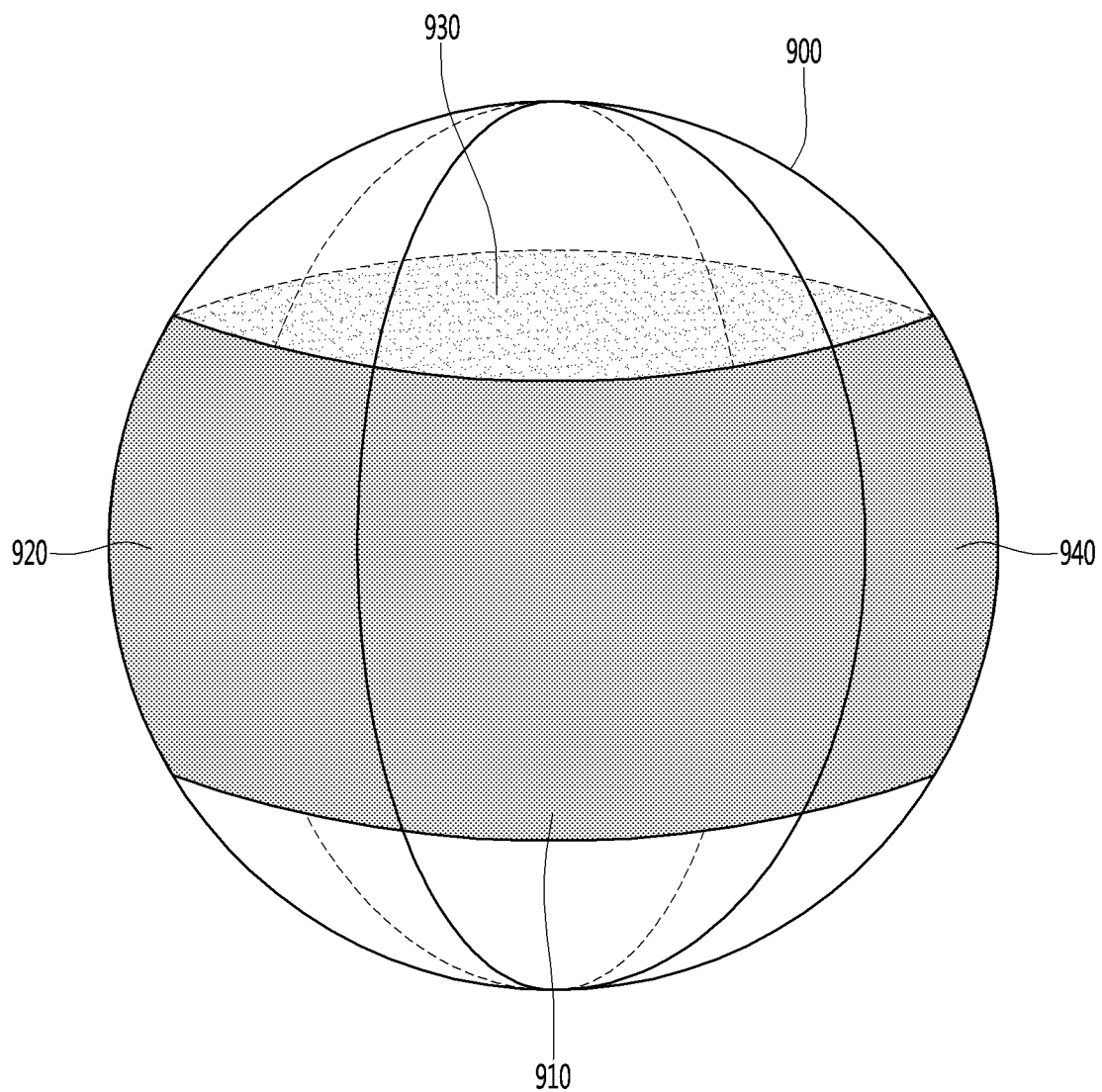

FIGS. 7 to 9 are views for describing an operating method when a first input is received, in accordance with an embodiment of the present disclosure.

In FIG. 4, it is assumed that an input for acquiring the one or more images respectively corresponding to one or more regions 620, 630, and 640 different from the first region 610 of the omnidirectionally captured image is received.

The input described with reference to FIG. 4 may be a first input. The first input may be an input for displaying the one or more thumbnail images respectively corresponding to the one or more regions parallel to the first region.

Also, the first input may be an input of a horizontal direction. For example, as shown in FIG. 7, the first input may be an input of touching a thumbnail image 710 corresponding to the first region of the omnidirectionally captured image and pinching out the touched thumbnail image in a horizontal direction.

On the other hand, when the first input is received, the controller 180 may acquire the one or more images respectively corresponding to the one or more regions different from the first region of the omnidirectionally captured image. Also, the controller 180 may store, in the storage unit (not illustrated), the one or more images respectively corresponding to the one or more regions different from the first region of the omnidirectionally captured image. Also, as shown in FIG. 8, the controller 180 may display one or more thumbnail images 720, 730, and 740 respectively corresponding to the one or more regions different from the first region of the omnidirectionally captured image.

One or more regions different from the first region of the omnidirectionally captured image may be one or more regions parallel to the first region, and the one or more images respectively corresponding to one or more regions different from the first region of the omnidirectionally captured image may be one or more images corresponding to one or more regions parallel to the first region.

For example, as shown in FIG. 9, when the first input is received from the user in a state in which the thumbnail image of the first region 910 in the entire region 900 of the omnidirectionally captured image is displayed, the controller 180 may acquire images respectively corresponding to one or more regions 920, 930, and 940 parallel to the first region and display thumbnail images 720, 730, and 740 respectively corresponding to the one or more regions 920, 930, and 940 parallel to the first region.

On the other hand, in FIG. 9, the first region 910, the second region 920, the third region 930, and the fourth region 940 have been described as having the same vertical angle, but the present disclosure is not limited thereto. The second region 920, the third region 930, and the fourth region 940 may be regions that are within regions parallel to the first region 910.

For example, in the virtual sphere with the capturing point as the center, the first region 910 in FIG. 9 may be a region that is within −45 degrees to 45 degrees vertically. However, in the virtual sphere with the capturing point as the center, the second region 920, the third region 930, and the fourth region 940 may be regions that are within −30 degrees to 30 degrees vertically.

Figure 10:
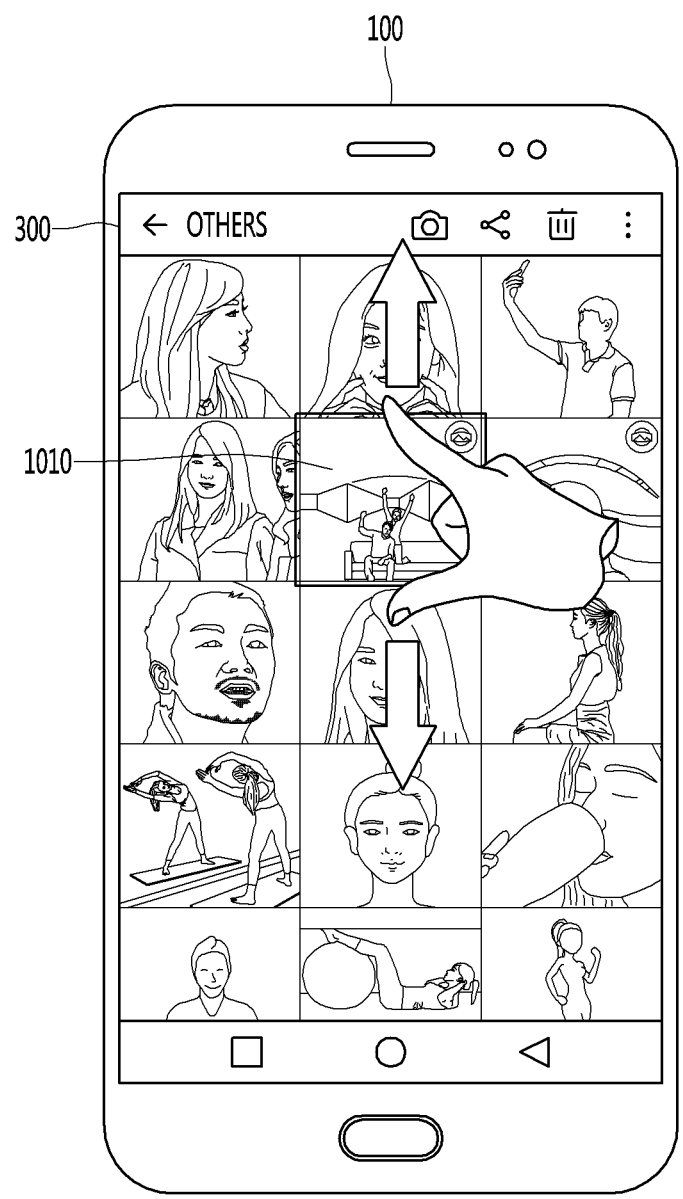
FIGS. 10 to 12 are views for describing an operating method when a second input is received, in accordance with an embodiment of the present disclosure.
Figure 11:
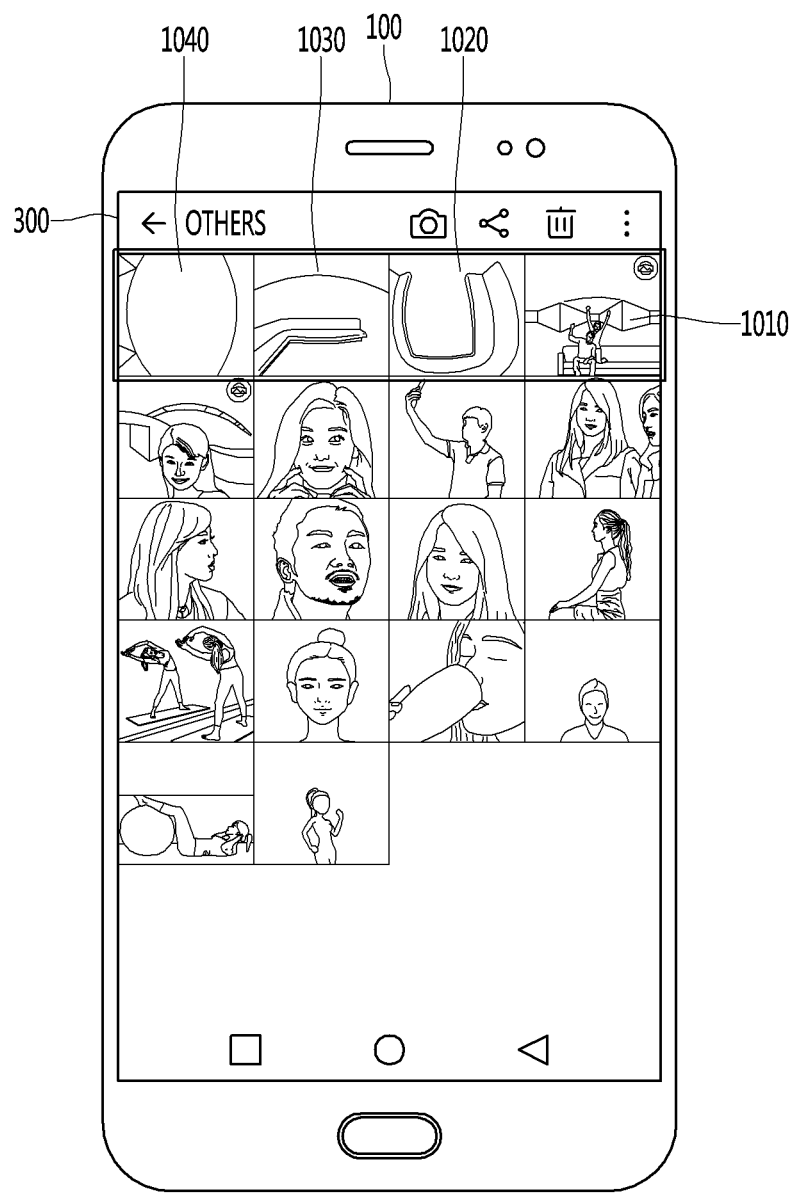
Figure 12:
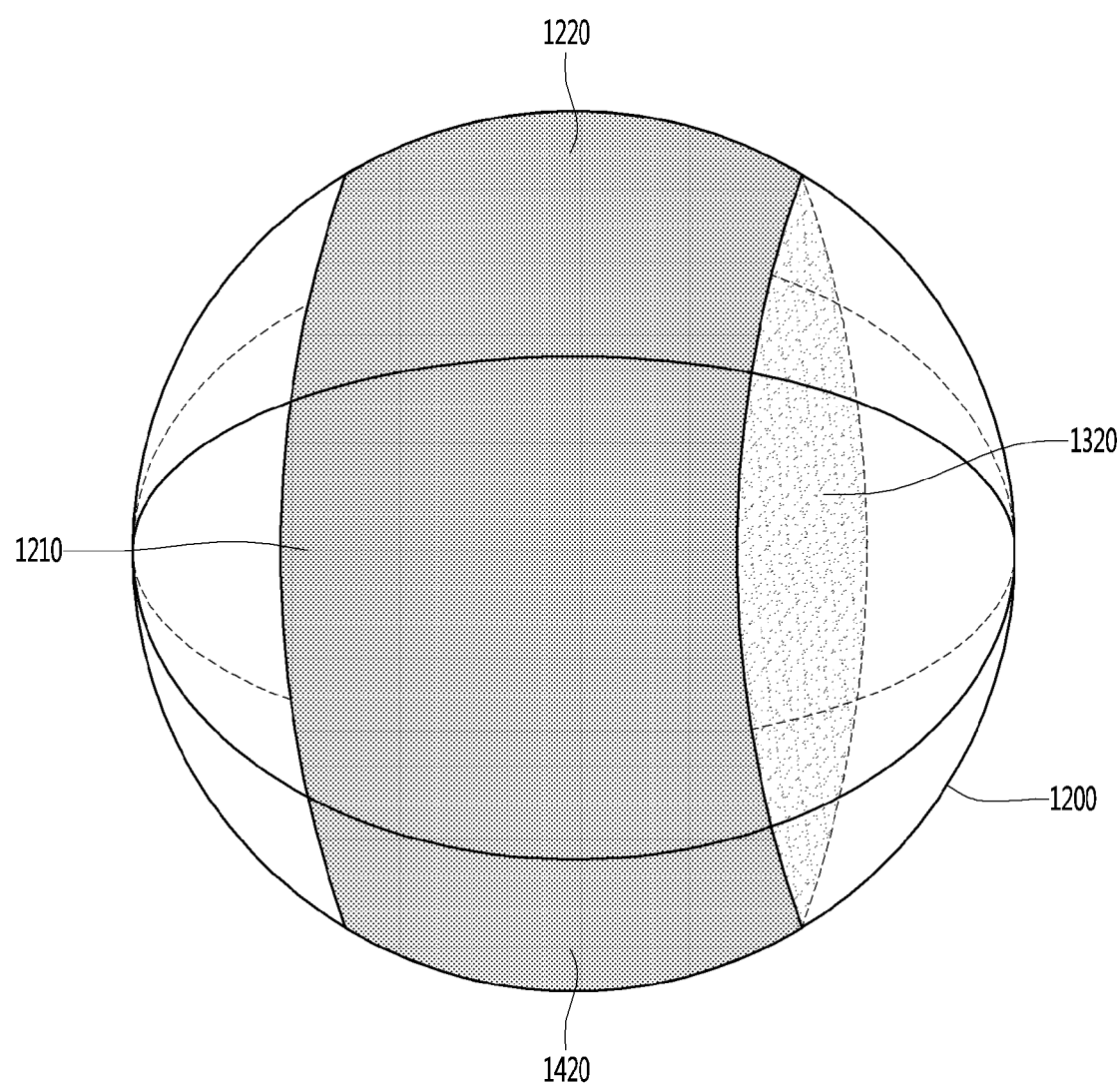

FIGS. 10 to 12 are views for describing an operating method when a second input is received, in accordance with an embodiment of the present disclosure.

In FIG. 4, it is assumed that an input for acquiring the one or more images respectively corresponding to the one or more regions 620, 630, and 640 different from the first region 610 of the omnidirectionally captured image is received.

The input described with reference to FIG. 4 may be a second input. The second input may be an input for displaying the one or more thumbnail images respectively corresponding to the one or more regions perpendicular to the first region.

Also, the second input may be an input of a vertical direction. For example, as shown in FIG. 10, the first input may be an input of touching a thumbnail image 1010 corresponding to the first region of the omnidirectionally captured image and pinching out the touched thumbnail image in a vertical direction.

On the other hand, when the second input is received, the controller 180 may acquire the one or more images respectively corresponding to the one or more regions different from the first region of the omnidirectionally captured image. Also, the controller 180 may store, in the storage unit (not illustrated), the one or more images respectively corresponding to the one or more regions different from the first region of the omnidirectionally captured image. Also, as shown in FIG. 11, the controller 180 may display one or more thumbnail images 1020, 1030, and 1040 respectively corresponding to the one or more regions different from the first region of the omnidirectionally captured image.

The one or more regions different from the first region of the omnidirectionally captured image may be one or more regions perpendicular to the first region, and the one or more images respectively corresponding to the one or more regions different from the first region of the omnidirectionally captured image may be one or more images respectively corresponding to the one or more regions perpendicular to the first region.

For example, as shown in FIG. 12, when the second input is received from the user in a state in which the thumbnail image of the first region 1210 in the entire region 1200 of the omnidirectionally captured image is displayed, the controller 180 may acquire images respectively corresponding to one or more regions 1220, 1230, and 1240 parallel to the first region and display thumbnail images 1020, 1030, and 1040 respectively corresponding to the one or more regions 1220, 1230, and 1240 parallel to the first region.

Also, the first region 1210 may mean a region that is within a first angle with respect to a capturing point. For example, in the virtual sphere with the capturing point as the center, the first region 1210 may be a region that is within −45 degrees to 45 degrees horizontally and −45 degrees to 45 degrees vertically with respect to the capturing point.

Also, the second region 1220 may be a region that is located within a region perpendicular to the first region 1210 and different from the first region 1210. For example, in the virtual sphere with the capturing point as the center, the second region 1220 may be a region that is within −45 degrees to 45 degrees horizontally and −45 degrees to 135 degrees vertically with respect to the capturing point.

Also, the third region 1230 may be a region that is located within a region perpendicular to the first region 1210 and different from the first region 1210 and the second region 1220. For example, in the virtual sphere with the capturing $1 point as the center, the third region 1230 may be a region that is within −45 degrees to 45 degrees horizontally and 135 degrees to 225 degrees vertically with respect to the capturing point.

Also, the fourth region 1240 may be a region that is located within a region perpendicular to the first region 1210 and different from the first region 1210, the second region 1220, and the third region 1230. For example, in the virtual sphere with the capturing point as the center, the fourth region 1240 may be a region that is within −45 degrees to 45 degrees horizontally and 225 degrees to 315 degrees vertically with respect to the capturing point.

On the other hand, in FIG. 12, the first region 1210, the second region 1220, the third region 1230, and the fourth region 1240 have been described as having the same horizontal angle, but the present disclosure is not limited thereto. The second region 1220, the third region 1230, and the fourth region 1240 may be regions that are within regions perpendicular to the first region 1210.

For example, in the virtual sphere with the capturing point as the center, the first region 1210 in FIG. 12 may be a region that is within −45 degrees to 45 degrees horizontally. However, in the virtual sphere with the capturing point as the center, the second region 1220, the third region 1230, and the fourth region 1240 may be regions that are within −30 degrees to 30 degrees horizontally.

Figure 13:
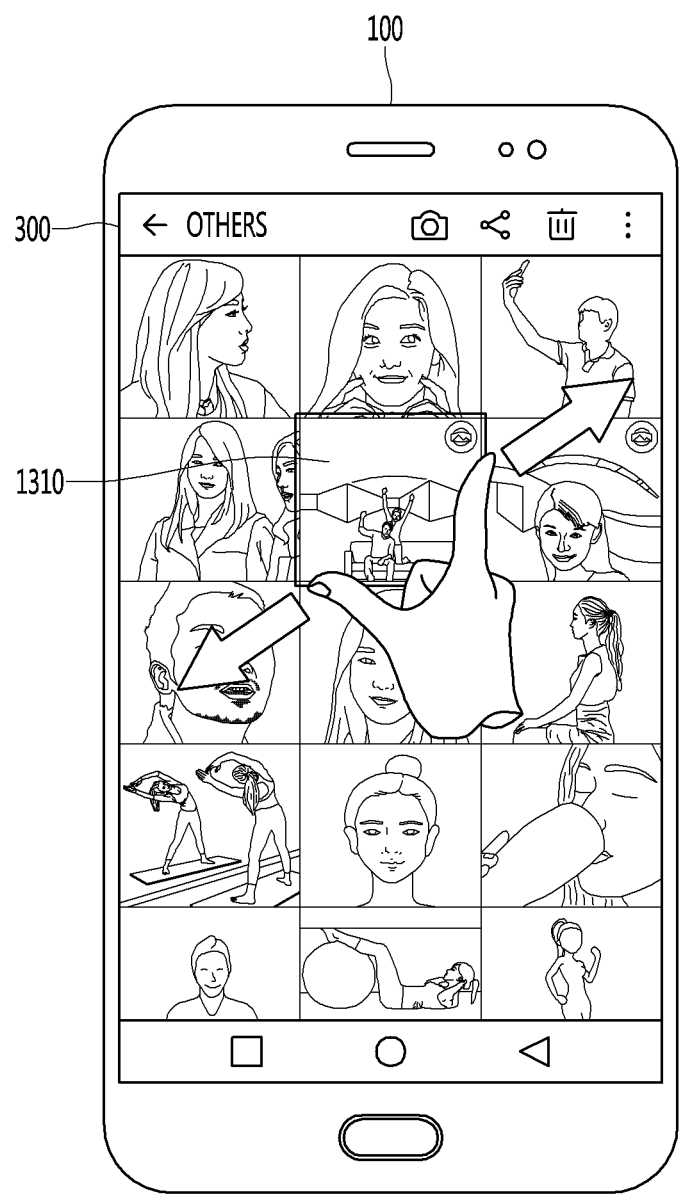
FIGS. 13 to 15 are views for describing an operating method when a third input is received, in accordance with an embodiment of the present disclosure.
Figure 14:
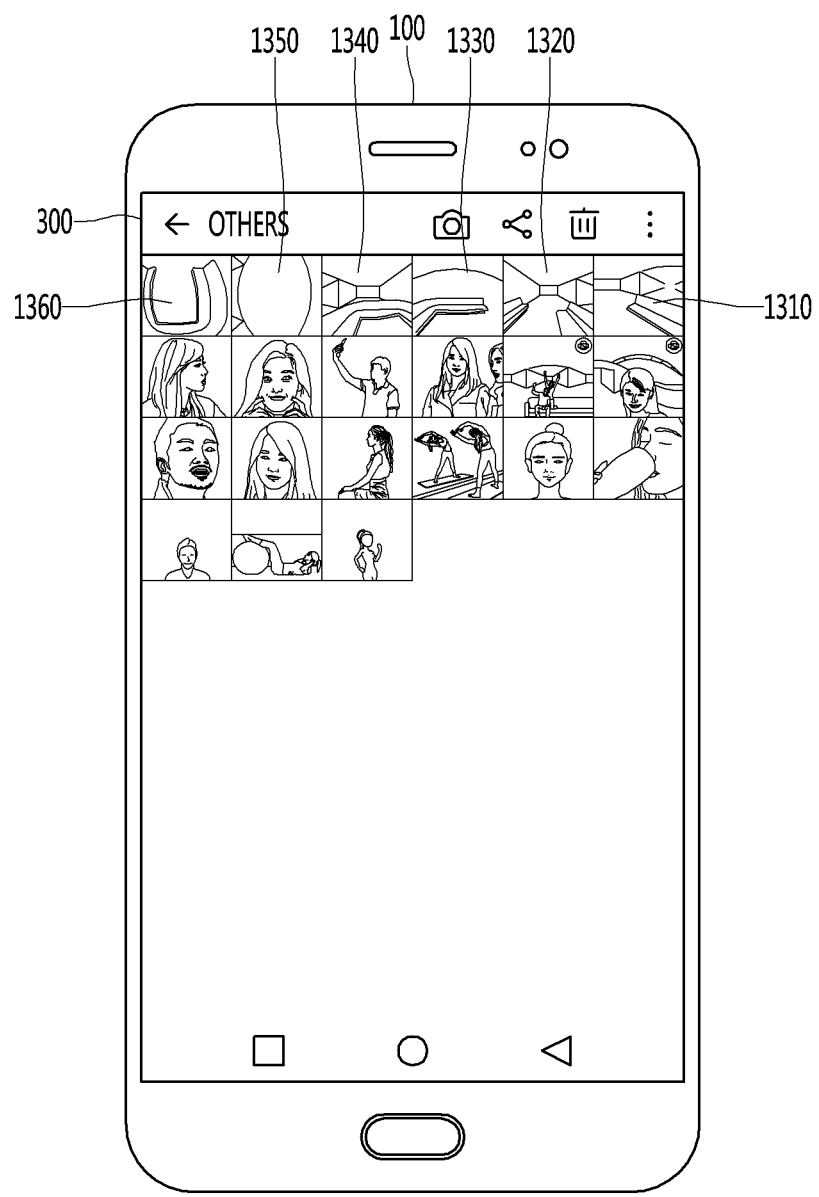
Figure 15:
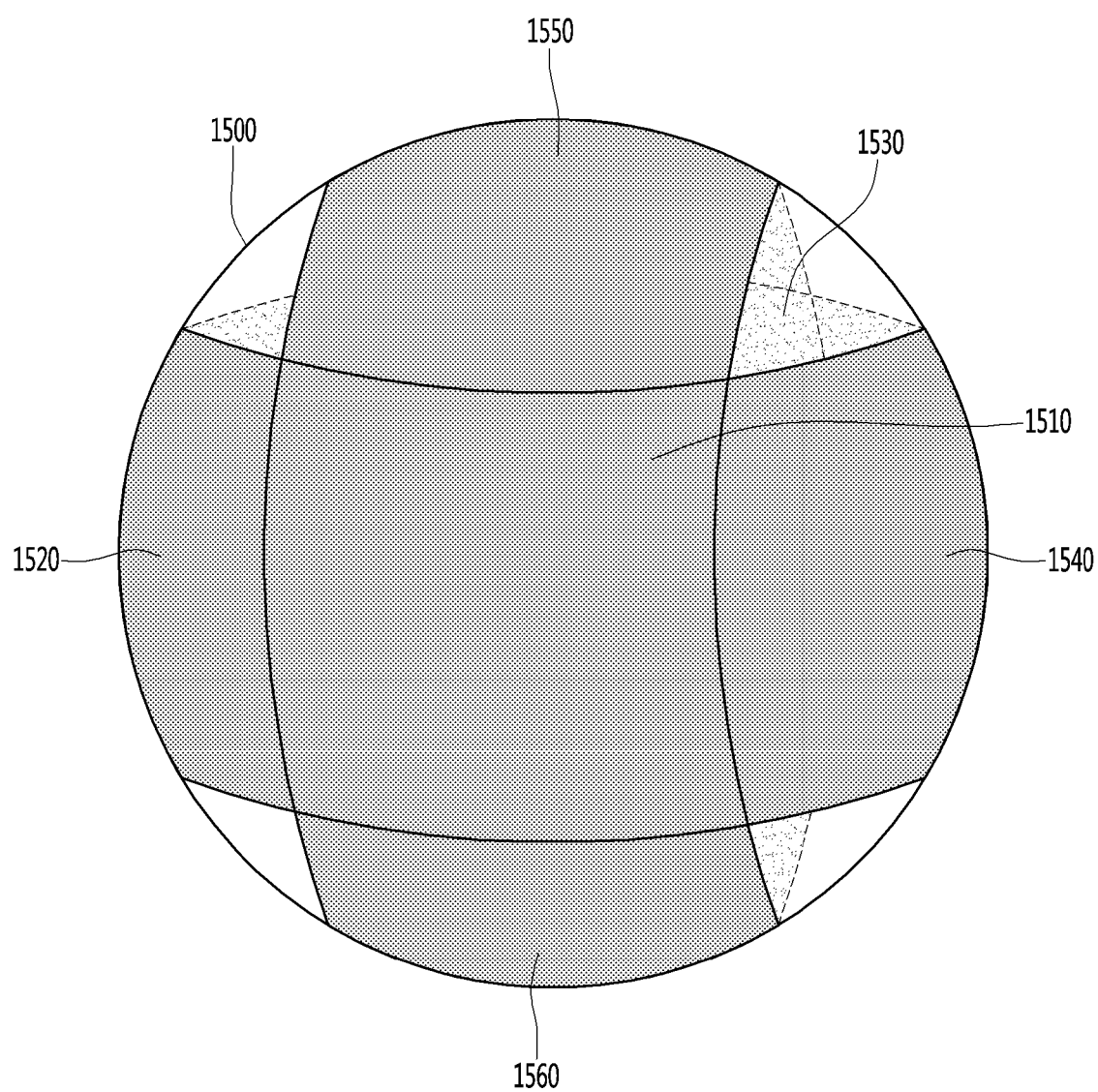

FIGS. 13 to 15 are views for describing an operating method when a third input is received, in accordance with an embodiment of the present disclosure.

In FIG. 4, it is assumed that an input for acquiring the one or more images respectively corresponding to the one or more regions 620, 630, and 640 different from the first region 610 of the omnidirectionally captured image is received.

The input described with reference to FIG. 4 may be a third input. The third input may be an input for displaying the one or more thumbnail images respectively corresponding to the one or more regions parallel to the first region and one or more regions perpendicular to the first region.

Also, the third input may be an input of a direction except for a horizontal direction and a vertical direction. For example, as shown in FIG. 13, the third input may be an input of touching a thumbnail image 1310 corresponding to the first region of the omnidirectionally captured image and pinching out the touched thumbnail image in a diagonal direction.

On the other hand, when the third input is received, the controller 180 may acquire the one or more images respectively corresponding to the one or more regions different from the first region of the omnidirectionally captured image. Also, the controller 180 may store, in the storage unit (not illustrated), the one or more images respectively corresponding to the one or more regions different from the first region of the omnidirectionally captured image. Also, as shown in FIG. 14, the controller 180 may display one or more thumbnail images 1320, 1330, 1340, 1350, and 1360 respectively corresponding to the one or more regions different from the first region of the omnidirectionally captured image.

The one or more regions different from the first region of the omnidirectionally captured image may be one or more regions parallel to the first region and one or more regions perpendicular to the first region, and the one or more images respectively corresponding to the one or more regions different from the first region of the omnidirectionally captured image may be one or more images respectively corresponding to the one or more regions parallel to the first region and one or more images corresponding to one or more regions perpendicular to the first region.

For example, as shown in FIG. 15, when the third input is received from the user in a state in which the thumbnail image of the first region 1510 in the entire region 1500 of the omnidirectionally captured image is displayed, the controller 180 may acquire images respectively corresponding to one or more regions 1520, 1530, and 1540 parallel to the first region and display thumbnail images 1320, 1330, 1340, 1350, and 1360 respectively corresponding to the one or more regions 1520, 1530, and 1540 parallel to the first region and one or more regions 1550 and 1560 perpendicular to the first region.

For example, the first region 1510 may be a region that is within −45 degrees to 45 degrees horizontally and −45 degrees to 45 degrees vertically with respect to the capturing point.

Also, the second region 1520 may be a region that is located within a region perpendicular to the first region 1510 and different from the first region 1510. For example, in the virtual sphere with the capturing point as the center, the second region 1520 may be a region that is within 45 degrees to 135 degrees horizontally and −45 degrees to 45 degrees vertically with respect to the capturing point.

Also, the third region 1530 may be a region that is located within a region parallel to the first region 1510 and different from the first region 1510 and the second region 1520. For example, in the virtual sphere with the capturing point as the center, the third region 1530 may be a region that is within 135 degrees to 225 degrees horizontally and −45 degrees to 45 degrees vertically with respect to the capturing point.

Also, the fourth region 1540 may be a region that is located within a region parallel to the first region 1510 and different from the first region 1510, the second region 1520, and the third region 1530. For example, in the virtual sphere with the capturing point as the center, the fourth region 1540 may be a region that is within 225 degrees to 315 degrees horizontally and −45 degrees to 45 degrees vertically with respect to the capturing point.

Also, the fifth region 1550 may be a region that is located within a region perpendicular to the first region 1510 and different from the first region 1510. For example, in the virtual sphere with the capturing point as the center, the fifth region 1550 may be a region that is within −45 degrees to 45 degrees horizontally and 45 degrees to 135 degrees vertically with respect to the capturing point.

Also, the third region 1530 may be a region that is located within a region perpendicular to the first region 1510 and different from the first region 1510 and the fifth region 1550. For example, in the virtual sphere with the capturing point as the center, the fifth region 1550 may be a region that is within −45 degrees to 135 degrees horizontally and 135 degrees to 225 degrees vertically with respect to the capturing point.

Also, the sixth region 1560 may be a region that is located within a region perpendicular to the fifth region 1550 and different from the first region 1510, the fifth region 1550, and the third region 1530. For example, in the virtual sphere with the capturing point as the center, the sixth region 1560 may be a region that is within −45 degrees to 45 degrees horizontally and 225 degrees to 315 degrees vertically with respect to the capturing point.

As described above with reference to FIGS. 7 to 15, it is possible to provide an environment that can acquire images of various directions according to a user selection with respect to a currently displayed region. For example, the user can input the first input when the user wants to acquire a general image of a horizontal direction to the currently displayed image, and can input the second input when the user wants to acquire a general image of a vertical direction to the currently displayed region. Also, when the user wants to acquire a general image of a vertical direction and a horizontal direction to the currently displayed image, the user can acquire a desired general image by inputting the third input.

Also, when an input of a horizontal direction is received, a thumbnail image of the horizontal direction is displayed, and when an input of a vertical direction is received, a thumbnail image of the vertical direction is displayed. In this manner, it is possible to provide an environment that allows the user to perform an input intuitively.

Figure 16:
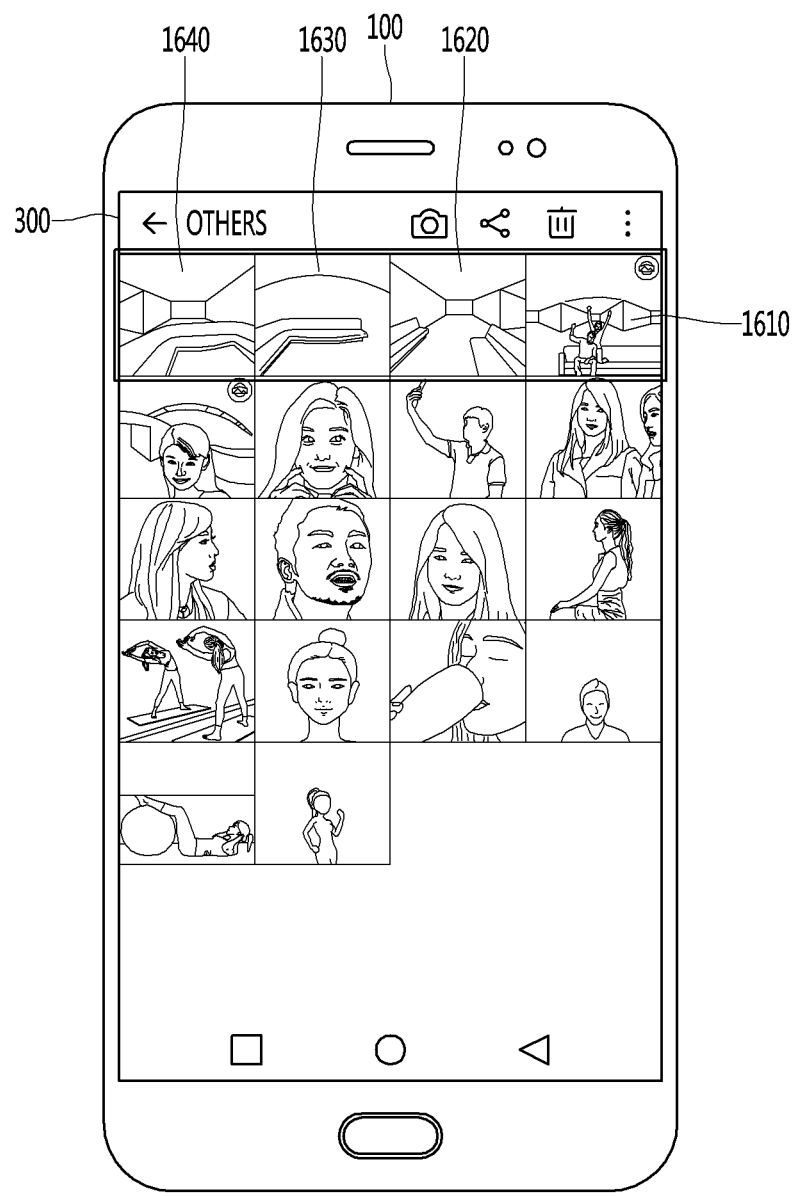
FIGS. 16 and 17 are views for describing a method of displaying one or more thumbnail images on a gallery, in accordance with an embodiment of the present disclosure.
Figure 17:
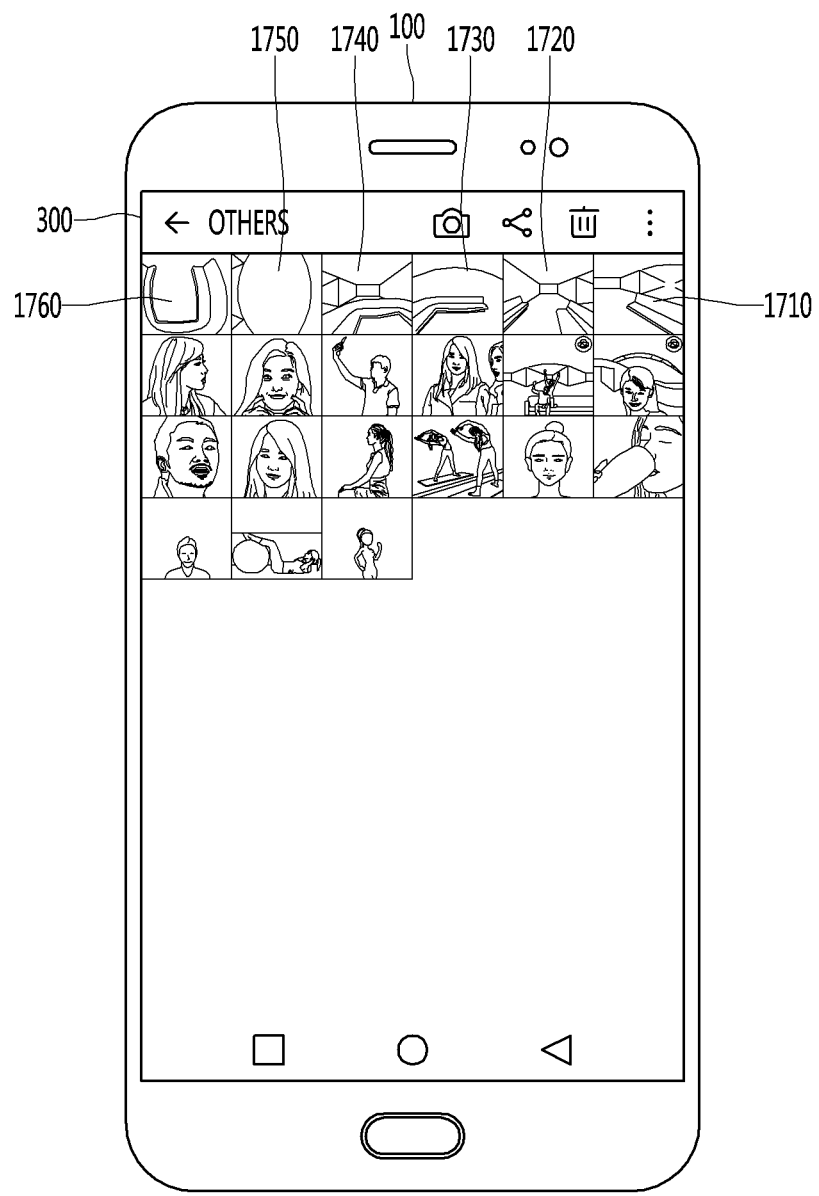

FIGS. 16 and 17 are views for describing a method of displaying one or more thumbnail images on a gallery, in accordance with an embodiment of the present disclosure.

The thumbnail image corresponding to the first region of the omnidirectionally captured image and the one or more thumbnail images respectively corresponding to the one or more region different from the first region may be displayed at the same row or the same column within the gallery.

Specifically, the gallery 300 may include one or more rows or one or more columns.

In this case, as shown in FIG. 16, the controller 180 may display the thumbnail image 1610 corresponding to the first region and one or more thumbnail images 1620, 1630, and 1640 respectively corresponding to one or more regions different from the first region at the same row within the gallery 300.

Also, the controller 180 may display the thumbnail image corresponding to the first region and the one or more thumbnail images respectively corresponding to the one or more regions different from the first region at the same column within the gallery 300.

On the other hand, the number of thumbnail images that can be arranged at the same row or the same column within the gallery 300 may be changed. For example, three thumbnail images, four thumbnail images, or five thumbnail images may be displayed at the same row within the gallery 300.

In this case, the controller 180 may changed the number of thumbnail images displayed at the same row within the gallery 300 or change the number of thumbnail images displayed at the same column within the gallery 300, based on the number of thumbnail images respectively corresponding to the first region and the number of one or more thumbnail images respectively corresponding to the one or more regions different from the first region.

For example, when the one or more thumbnail images respectively corresponding to the one or more regions different from the first region are not acquired, the controller 180 may display three thumbnail images at the same row within the gallery 300.

Also, as shown in FIG. 16, when the number of the thumbnail image 1610 corresponding to the first region and one or more thumbnail images 1620, 1630, and 1640 respectively corresponding to one or more regions different from the first region is four, the controller 180 may change the number of thumbnail images displayed at the same row within the gallery 300 to four. That is, the controller 180 may change the number of thumbnail images displayed at the same row within the gallery 300, so that the thumbnail image 1610 corresponding to the first region and the one or more thumbnail images 1620, 1630, and 1640 respectively corresponding to the one or more regions different from the first region are displayed at the same row.

Also, as shown in FIG. 17, when the number of the thumbnail image 1710 corresponding to the first region and one or more thumbnail images 1720, 1730, 1740, 1750, and 1760 respectively corresponding to the one or more regions different from the first region is six, the controller 180 may change the number of thumbnail images displayed at the same row within the gallery 300 to six. That is, the controller 180 may change the number of thumbnail images displayed at the same row within the gallery 300, so that the thumbnail image 1710 corresponding to the first region and the one or more thumbnail images 1720, 1730, 1740, 1750, and 1760 respectively corresponding to the one or more regions different from the first region are displayed at the same row.

As such, when the plurality of thumbnail images 1610, 1620, 1630, and 1640 of the omnidirectionally captured image are displayed, the plurality of thumbnail images 1610, 1620, 1630, and 1640 of the omnidirectionally captured image are displayed while being aligned at one row or one column. Therefore, the user can easily recognize that the plurality of thumbnail images 1610, 1620, 1630, and 1640 are images acquired from one omnidirectionally captured image, and the user can easily distinguish the general image from the partial image of the omnidirectionally captured image.

FIGS. 18 to 23 are views for describing a method of displaying one or more thumbnail images on a gallery, in accordance with another embodiment of the present disclosure.

The thumbnail image corresponding to the first region of the omnidirectionally captured image and the one or more thumbnail images respectively corresponding to the one or more regions different from the first region may be displayed at the same row or at the same column, or may be displayed at the same row and the same column.

Specifically, the gallery 300 may include one or more rows or one or more columns.

On the other hand, the one or more thumbnail images may be images respectively corresponding to the one or more regions parallel to the first region.

Figure 18:
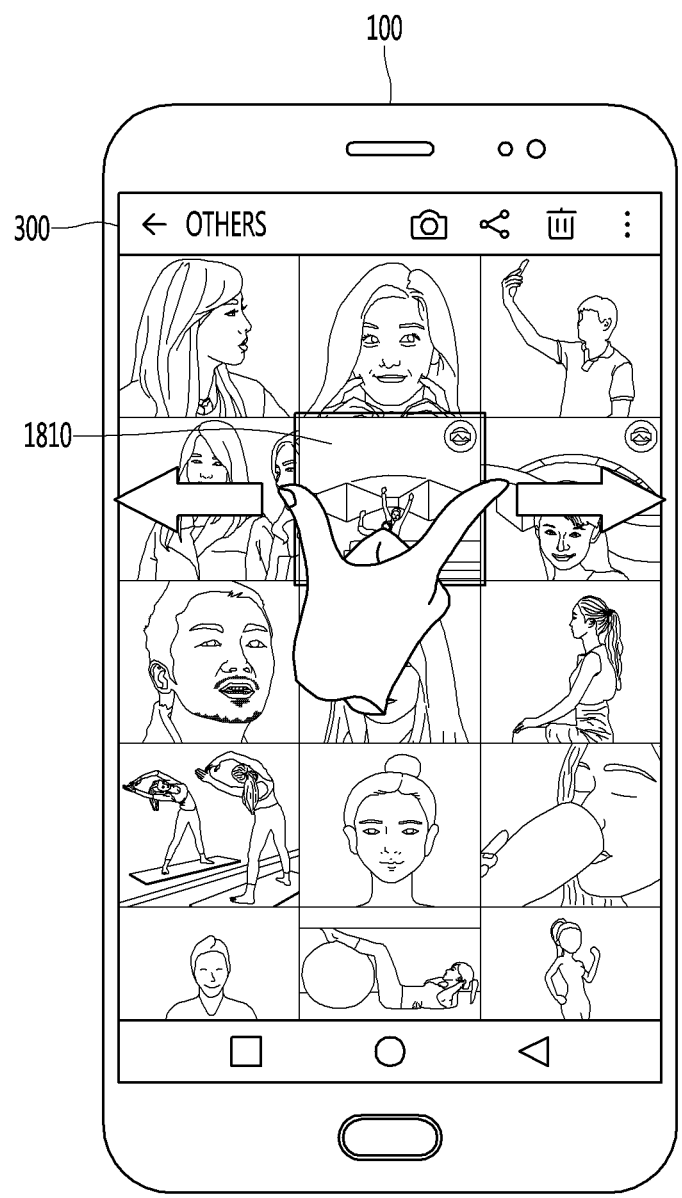
FIGS. 18 to 23 are views for describing a method of accordance with another embodiment of the present disclosure.

Specifically, as shown in FIG. 18, the controller 180 may receive a first input from a user in a state in which a thumbnail image 1810 of a first region of the omnidirectionally captured image is displayed.

Figure 19:
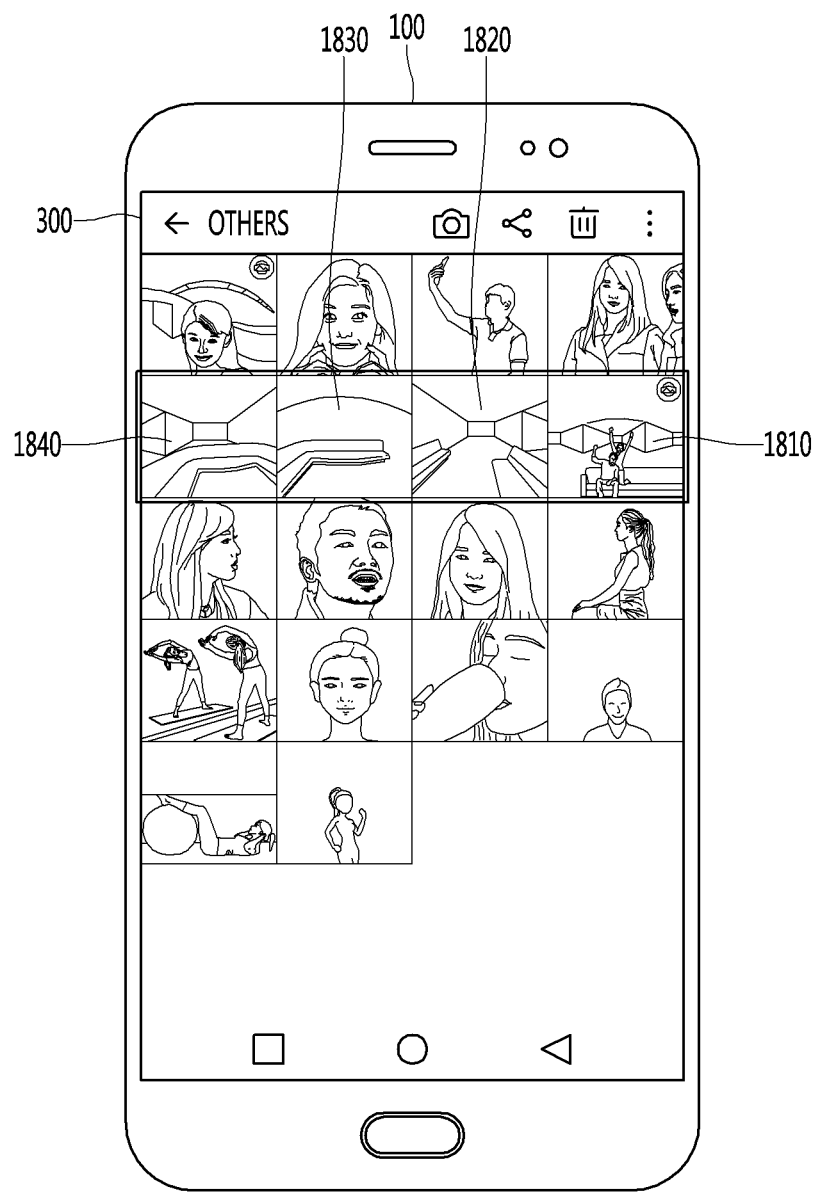

Also, as shown in FIG. 19, when the first input is received, the controller 180 may display thumbnail images 1820, 1830, and 1840 respectively corresponding to the one or more regions parallel to the first region.

In this case, the thumbnail images 1820, 1830, and 1840 respectively corresponding to the one or more regions parallel to the first region may be displayed at the same row as the thumbnail image 1810 of the first region. Specifically, the controller 180 may display the thumbnail images 1820, 1830, and 1840 respectively corresponding to the one or more regions parallel to the first region at the same row as the thumbnail image 1810 of the first region, based on information on the row where the thumbnail image 1810 of the first region is located.

Also, even when the display position of the thumbnail image 1810 of the first region is changed, the thumbnail images 1820, 1830, and 1840 respectively corresponding to the one or more regions parallel to the first region may be displayed at the same row as the thumbnail image 1810 of the first region. For example, when the thumbnail image 1810 of the first region is displayed at the first row, the thumbnail images 1820, 1830, and 1840 respectively corresponding to the one or more regions parallel to the first region may also be displayed at the same first row.

On the other hand, the thumbnail images 1820, 1830, and 1840 respectively corresponding to the one or more regions parallel to the first region may be arranged to correspond to the positions of the one or more regions parallel to the first region.

For example, when the first region is a region that is within −45 degrees to 45 degrees horizontally and −45 degrees to 45 degrees vertically with respect to the capturing point and the second region is a left first region of the first region (that is, the second region is a region that is within 45 degrees to 135 degrees horizontally and −45 degrees to 45 degrees vertically with respect to the capturing point), the controller 180 may display the second thumbnail image 1820 in the left first region of the first thumbnail image 1810 within the gallery 300.

As another example, when the first region is a region that is within −45 degrees to 45 degrees horizontally and −45 degrees to 45 degrees vertically with respect to the capturing point and the third region is a left second region of the first region (that is, the third region is a region that is within 135 degrees to 225 degrees horizontally and −45 degrees to 45 degrees vertically with respect to the capturing point), the controller 180 may display the third thumbnail image 1830 in the left second region of the first thumbnail image 1810 within the gallery 300.

As another example, when the first region is a region that is within −45 degrees to 45 degrees horizontally and −45 degrees to 45 degrees vertically with respect to the capturing point and the fourth region is a left third region of the first region (that is, the fourth region is a region that is within 225 degrees to 315 degrees horizontally and −45 degrees to 45 degrees vertically with respect to the capturing point), the controller 180 may display the fourth thumbnail image 1840 in the left third region of the first thumbnail image 1810 within the gallery 300.

On the other hand, the one or more thumbnail images may be images perpendicular to the one or more regions parallel to the first region.

Figure 20:
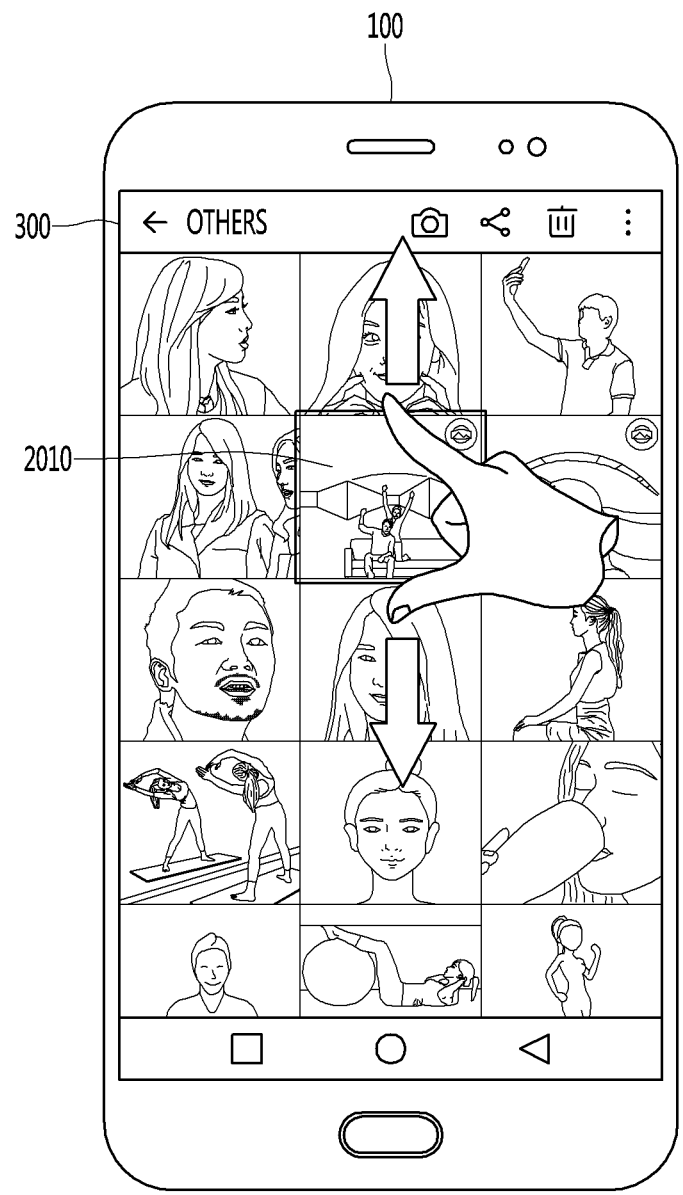

Specifically, as shown in FIG. 20, the controller 180 may receive a second input from a user in a state in which a thumbnail image 2010 of a first region in the entire region of the omnidirectionally captured image is displayed.

Figure 21:
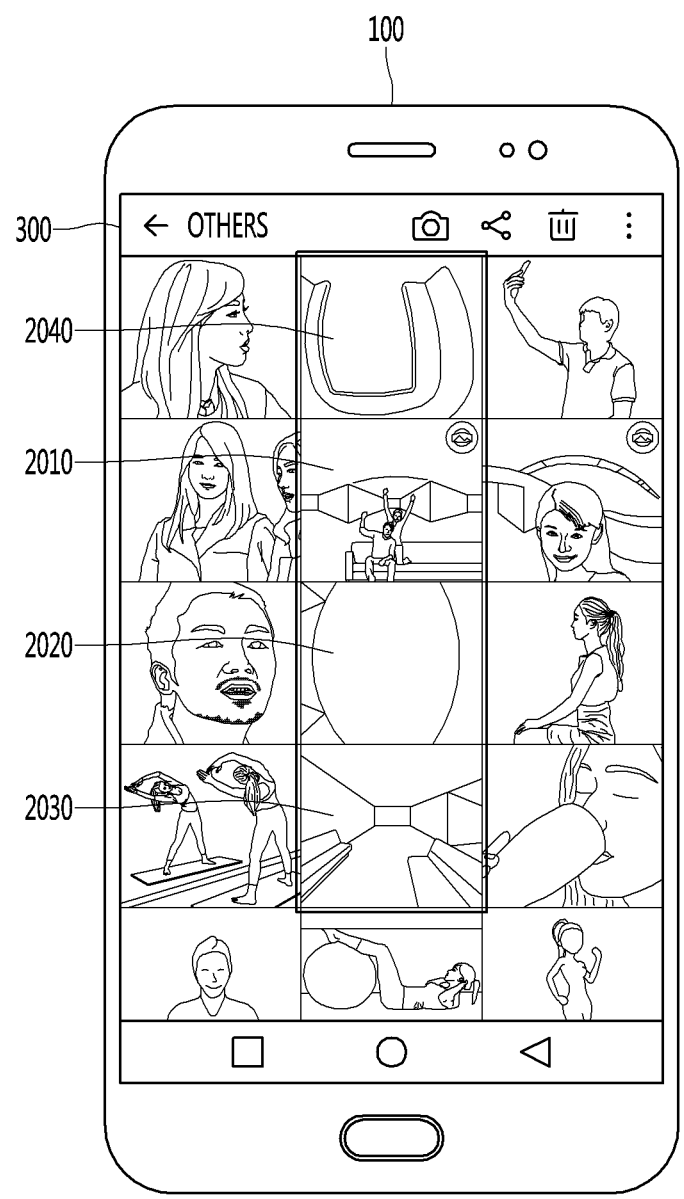

Also, as shown in FIG. 21, when the second input is received, the controller 180 may display thumbnail images 2020, 2030, and 2040 respectively corresponding to one or more regions perpendicular to the first region.

In this case, the thumbnail images 2020, 2030, and 2040 respectively corresponding to the one or more regions perpendicular to the first region may be displayed at the same column as the thumbnail image 2010 of the first region.

Also, even when the display position of the thumbnail image 2010 of the first region is changed, the thumbnail images 2020, 2030, and 2040 respectively corresponding to the one or more regions perpendicular to the first region may be displayed at the same column as the thumbnail image 2010 of the first region.

On the other hand, the thumbnail images 2020, 2030, and 2040 respectively corresponding to the one or more regions perpendicular to the first region may be displayed to correspond to the positions of one or more regions perpendicular to the first region.

For example, when the first region is a region that is within −45 degrees to 45 degrees horizontally and −45 degrees to 45 degrees vertically with respect to the capturing point and the second region is a lower first region of the first region (that is, the second region is a region that is within −45 degrees to 45 degrees horizontally and −45 degrees to 135 degrees vertically with respect to the capturing point), the controller 180 may display the second thumbnail image 2020 in the lower first region of the second thumbnail image 2010 within the gallery 300.

As another example, when the first region is a region that is within −45 degrees to 45 degrees horizontally and −45 degrees to 45 degrees vertically with respect to the capturing point and the fourth region is an upper first region of the first region (that is, the fourth region is a region that is within −45 degrees to 45 degrees horizontally and 225 degrees to 315 degrees vertically with respect to the capturing point), the controller 180 may display the fourth thumbnail image 2040 in the upper first region of the first thumbnail image 2010 within the gallery 300.

On the other hand, the one or more thumbnail images may be images respectively corresponding to the one or more regions parallel to the first region and images respectively corresponding to the one or more regions perpendicular to the first region.

Figure 22:
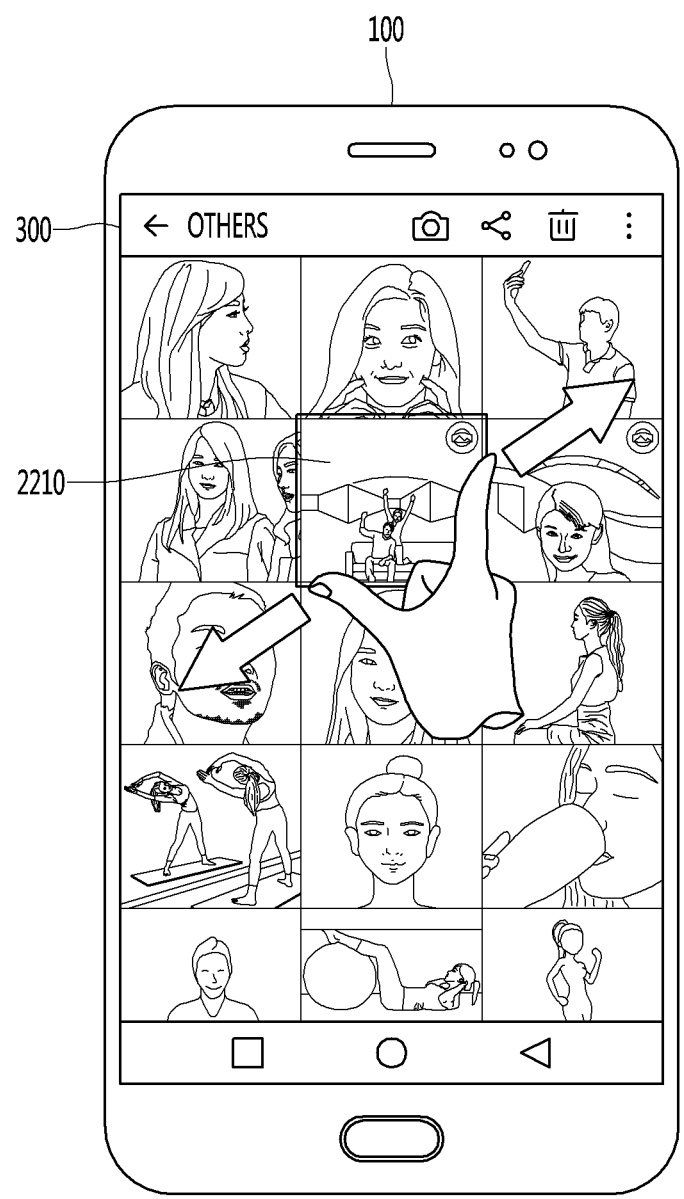

Specifically, as shown in FIG. 22, the controller 180 may receive a third input from a user in a state in which a thumbnail image 2210 of a first region in the entire region of the omnidirectionally captured image is displayed.

Figure 23:
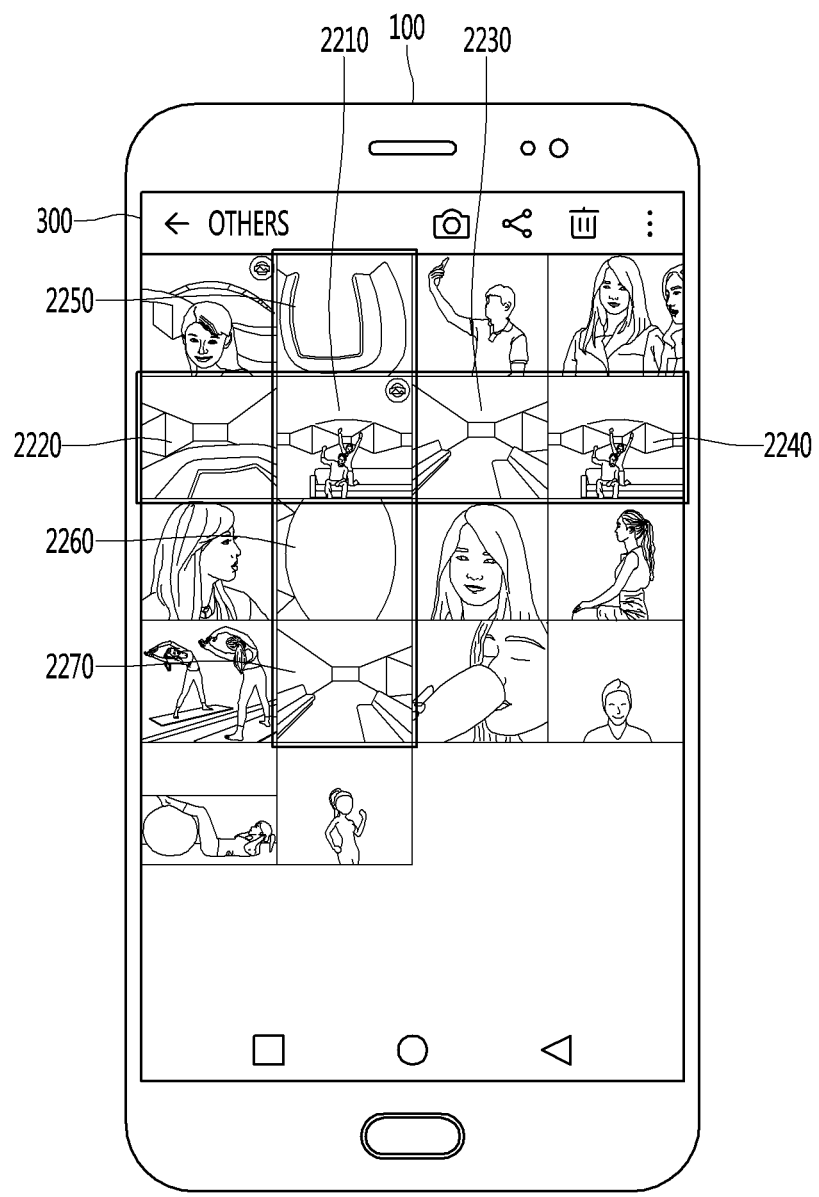

Also, as shown in FIG. 23, when the third input is received, the controller 180 may display thumbnail images 2220, 2230, 2240, 2250, 2260, and 2270 respectively corresponding to the one or more regions parallel to the first region and the one or more regions perpendicular to the first region.

In this case, the controller 180 may display the thumbnail images 2220, 2230, and 2240 respectively corresponding to the one or more regions parallel to the first region at the same row as the thumbnail image 2210 of the first region, and may display the thumbnail images 2250, 2260, and 2270 respectively corresponding to the one or more regions perpendicular to the first region at the same column as the thumbnail image 2210 of the first region On the other hand, the thumbnail images 2220, 2230, and 2240 respectively corresponding to the one or more regions parallel to the first region may be displayed to correspond to the positions of the one or more regions parallel to the first region, and the thumbnail images 2020, 2030, and 2040 respectively corresponding to the one or more regions perpendicular to the first region may be displayed to correspond to the positions of one or more regions perpendicular to the first region As such, in accordance with the present disclosure, since the direction of the region corresponding to the thumbnail image matches the direction of the thumbnail image, it is possible to provide an environment that allows a user to intuitively grasp the direction of the thumbnail image.

Also, since the position of the thumbnail image is displayed to correspond to the position of the region corresponding to the thumbnail image, it is possible to provide an environment that allows a user to intuitively grasp the direction and the position of the thumbnail image.

FIGS. 24 to 27 are views for describing a method of changing a region of a first thumbnail image corresponding to a first region, in accordance with an embodiment of the present disclosure.

Figure 24:
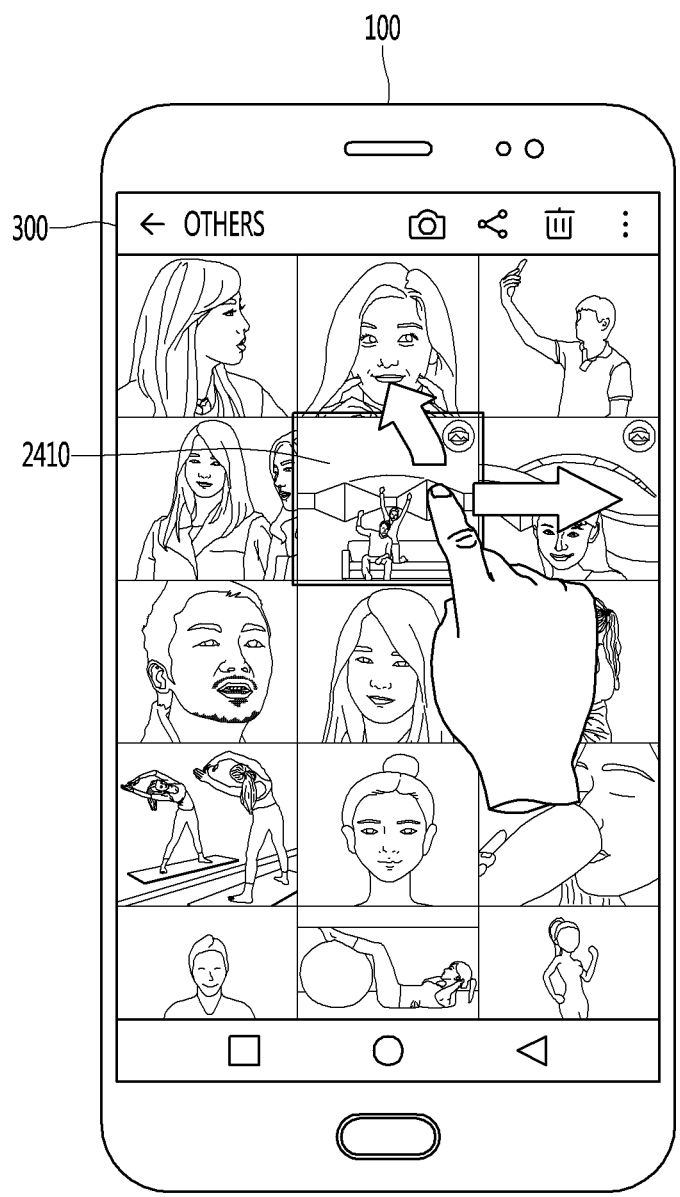
FIGS. 24 to 27 are views for describing a method of changing a region of a first thumbnail image corresponding to a first region, in accordance with an embodiment of the present disclosure.
Figure 25:
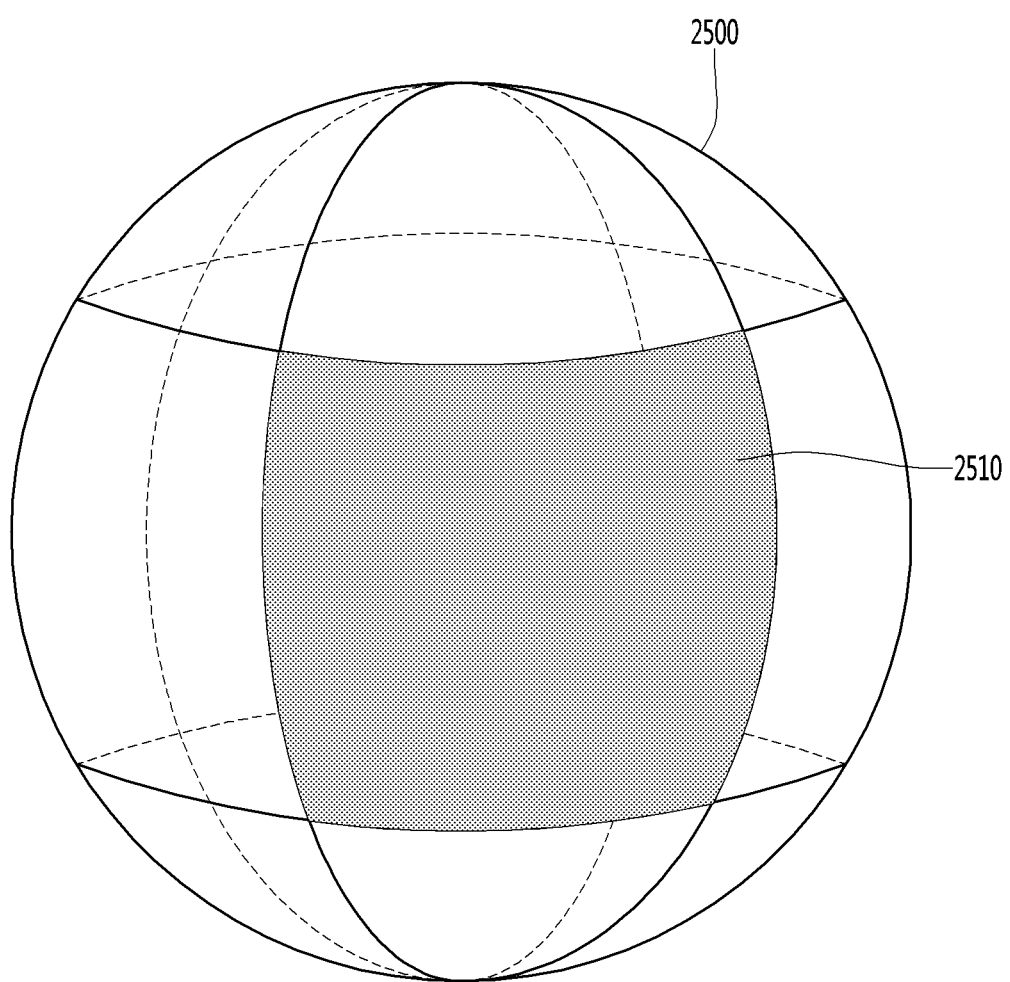

Referring to FIG. 24, a first thumbnail image 2410 corresponding to a first region is displayed on a screen. A first region 2510 in an entire region 2500 of an omnidirectionally captured image is shown in FIG. 25.

The controller 180 may receive an eighth input from a user through the input unit 120. The eighth input may be at least one of an input of rotating the first region of the omnidirectionally captured region and an input of moving the first region of the omnidirectionally captured region.

Also, as displayed in FIG. 24, the input of rotating the first region of the omnidirectionally captured image may be an input of touching a thumbnail image 2410 corresponding to the first region and dragging the thumbnail image 2410 in a curve form, and the input of moving the first region of the omnidirectionally captured image may be an input of touching the thumbnail image 2410 corresponding to the first region and dragging the thumbnail image 2410 in a straight line form.

On the other hand, when an eighth input is received, the controller 180 may change the thumbnail image 2410 corresponding to the first region of the omnidirectionally captured image to a thumbnail image corresponding to a second region of the omnidirectionally captured image and display the changed thumbnail image.

Figure 26:
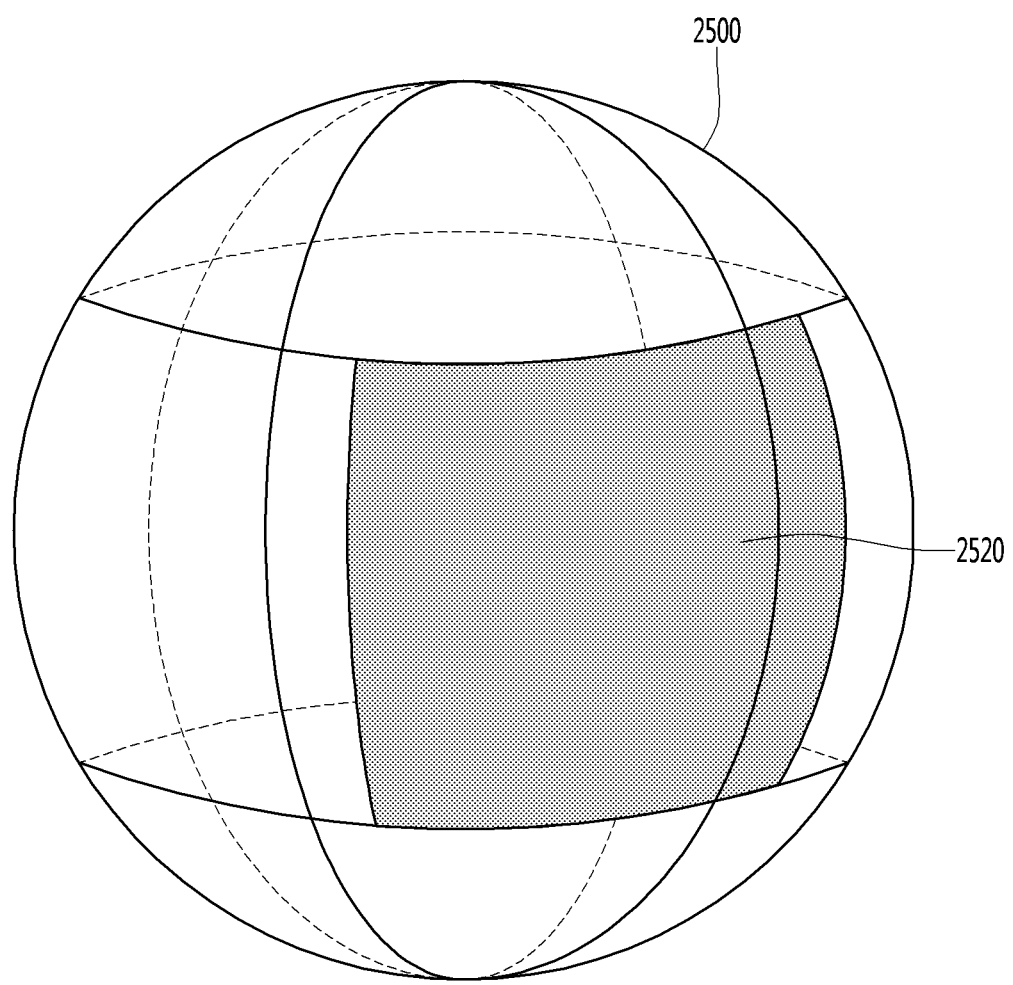

When the eighth input is an input of moving the first region of the omnidirectionally captured image, the second region may be a region moved from the first region in a direction of the eighth input. For example, when the eighth input is an input of dragging in a right direction, the second region 2520 may be a region moved right from the first region 2510 as shown in FIG. 26.

In this case, the controller 180 may change the thumbnail image 2410 corresponding to the first region 2510 of the omnidirectionally captured image to the thumbnail image corresponding to the second region 2520 of the omnidirectionally captured image and display the changed thumbnail image.

Figure 27:
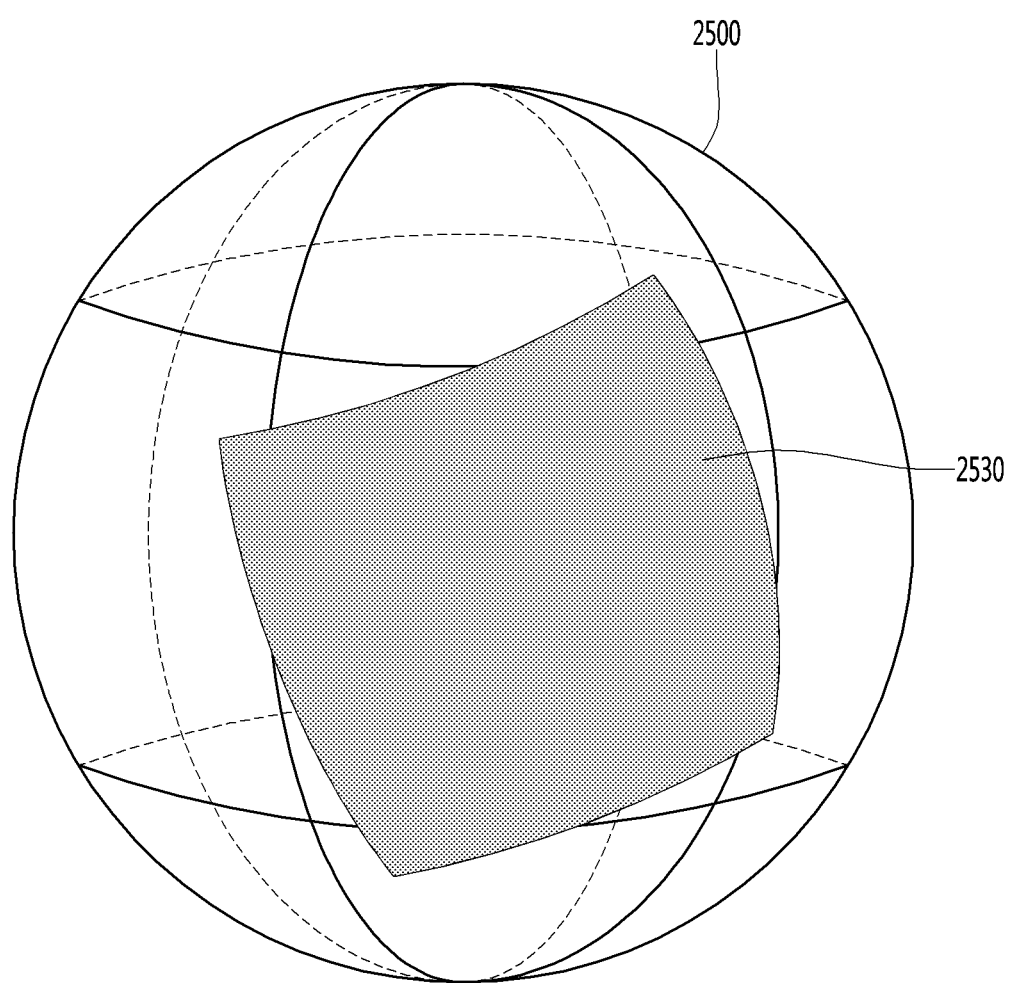

When the eighth input is an input of rotating the first region of the omnidirectionally captured image, the second region may be a region rotated from the first region in a direction of the eighth input. For example, when the eighth input is an input of dragging counterclockwise, the second region 2530 may be a region rotated counterclockwise from the first region 2510 as shown in FIG. 27.

In this case, the controller 180 may change the thumbnail image 2410 corresponding to the first region 2510 of the omnidirectionally captured image to the thumbnail image corresponding to the second region 2530 of the omnidirectionally captured image and display the changed thumbnail image.

On the other hand, in a state in which the thumbnail image corresponding to the second region is displayed, all the embodiments described with reference to FIGS. 2 to 23 or all subsequent embodiments can be applied. For example, the controller 180 may acquire the image corresponding to the second region. As another example, the controller 180 may acquire one or more images respectively corresponding to the one or more regions different from the second region 2520 moved from the first region and display one or more thumbnail images respectively corresponding to the one or more regions different from the second region 2520 moved from the first region. As another example, the one or more thumbnail images respectively corresponding to the one or more regions perpendicular to the second region 2530 rotated from the first region and display one or more thumbnail images respectively corresponding to one or more regions parallel to the second region 2530 rotated from the first region.

In the omnidirectionally captured image, the thumbnail image displayed in the gallery by default (that is, the thumbnail image corresponding to the first region) is generally a thumbnail image of the frontward region of the omnidirectional camera.

However, the omnidirectional camera is movable during capturing, and thus, the thumbnail image displayed in the gallery by default may be a distorted image.

In accordance with the present disclosure, it is possible to provide an environment that can acquire an angle-modified image by modifying an angle of the thumbnail image displayed in the gallery by default.

Also, when a horizontal-direction or vertical-direction image in a state in which an angle is distorted, an image that is not desired by the user may be acquired. For example, in a case where the user wants to acquire a plurality of general horizontal images, when the angle of the thumbnail image displayed by default is not horizontal with respect to the ground, the general image may also include an image that is not desired by the user.

Even in this case, in accordance with the present disclosure, the image desired by the user can be easily acquired by modifying the angle of the thumbnail image displayed by fault.

On the other hand, when an input of selecting the thumbnail image 2410 corresponding to the second region of the omnidirectionally captured image is received, the controller 180 may display the omnidirectionally captured image in an omnidirectional display mode.

The omnidirectional display mode may mean a mode in which an image of a partial region of an omnidirectionally captured image is displayed, and then, an image of the other region is displayed according to a user manipulation.

Specifically, when the input of selecting the thumbnail image 2410 corresponding to the first region 2510 of the omnidirectionally captured image is received in a state in which the thumbnail image 2410 corresponding to the first region 2510 of the omnidirectionally captured image, the controller 180 may display the image corresponding to the first region of the omnidirectionally captured image. In this case, when an input for displaying a region different from the first region is received, the controller 180 may display an image of the region different from the first region based on the input.

On the other hand, when the input of selecting the thumbnail images 2410 corresponding to the second regions 2520 and 2530 of the omnidirectionally captured image is received in a state in which the thumbnail images corresponding to the second regions 2520 and 2530 of the omnidirectionally captured image is displayed, the controller 180 may display the images corresponding to the second regions 2520 and 2530 of the omnidirectionally captured image. In this case, when an input for displaying a region different from the second regions is received, the controller 180 may display an image of the region different from the second regions based on the input.

In the omnidirectional display mode, a partial image of the omnidirectionally captured image is first displayed. Therefore, the user needs to move the image so as to view a desired image.

However, in accordance with the present disclosure, it is possible to provide an environment that allows the user to start viewing the desired image at a desired angle.

On the other hand, the omnidirectionally captured image may be a moving picture. In this case, the image that the user wants to view may be overlooked while the user performs a manipulation so as to view a desired image. In this case, the present disclosure may be more usefully used.

Figure 28:
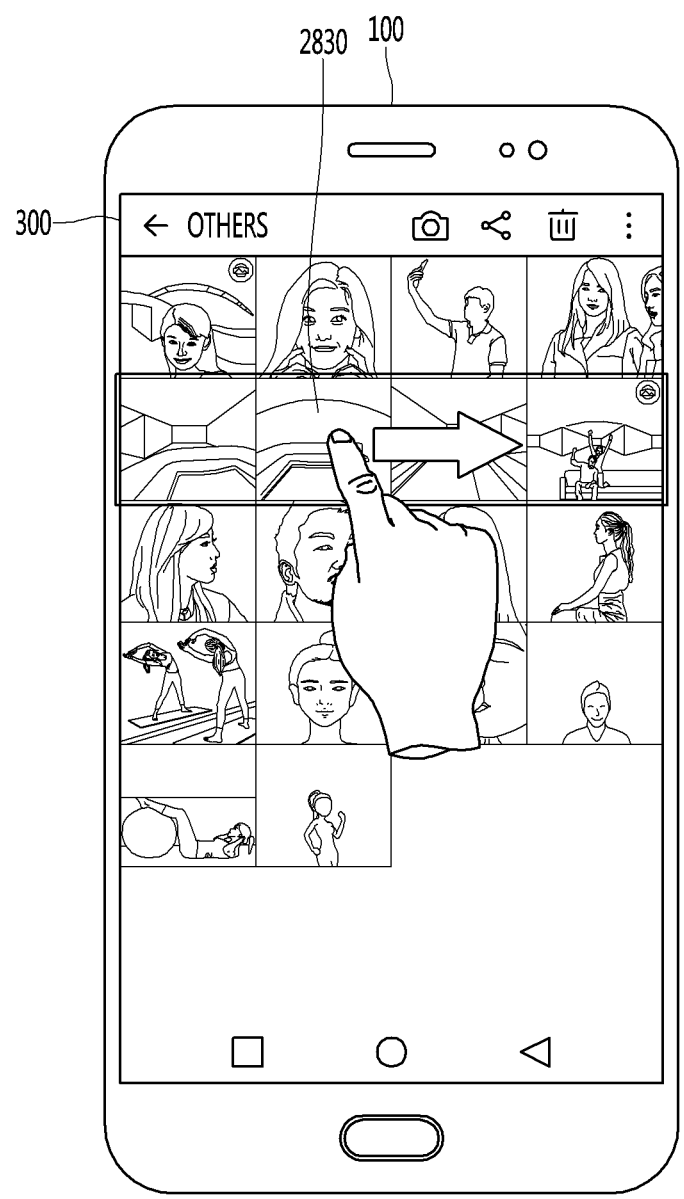
FIGS. 28 to 30 are views for describing a method of changing a region of a generated thumbnail image, in accordance with an embodiment of the present disclosure.
Figure 29:
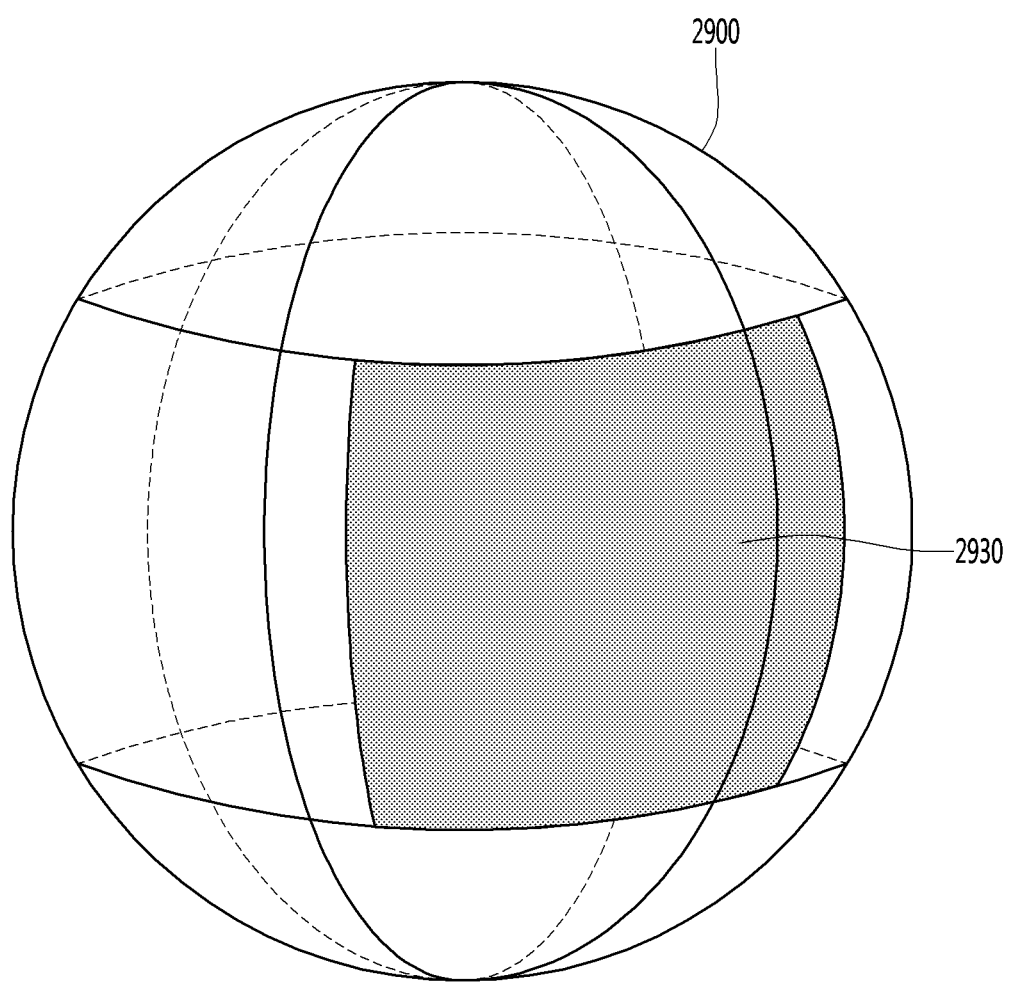
Figure 30:
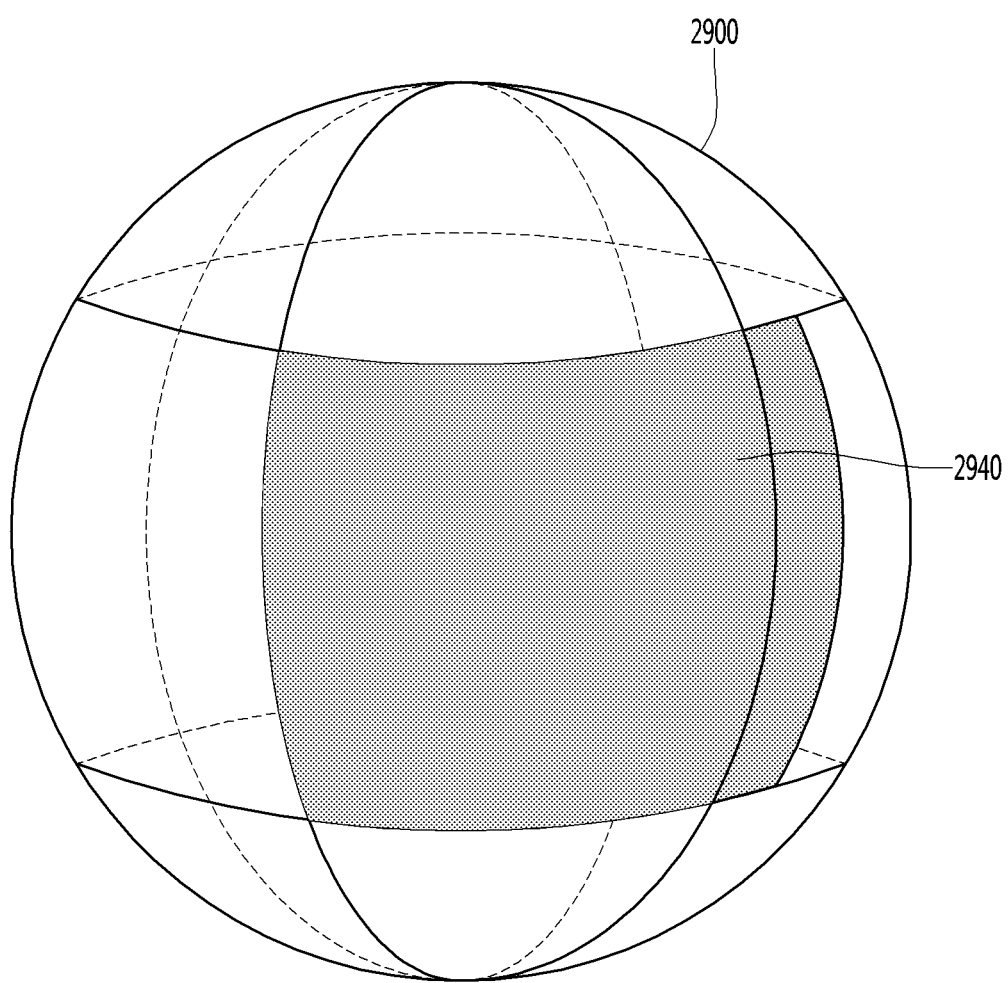

FIGS. 28 to 30 are views for describing a method of changing a region of a generated thumbnail image, in accordance with an embodiment of the present disclosure.

Referring to FIG. 28, a thumbnail image corresponding to a first region of an omnidirectionally captured image and thumbnail images respectively corresponding to the one or more regions different from the first region of the omnidirectionally captured image are displayed on a gallery 300. The thumbnail images corresponding to the one or more regions may include a second thumbnail image 2830 corresponding to a second region.

On the other hand, the controller 180 may receive a sixth input for the second thumbnail image 2830. The sixth input for the second thumbnail image 2830 may be an input for moving a region corresponding to the second thumbnail image 2830 in a direction of the sixth input.

For example, the image corresponding to the second region may be stored in the storage unit 170 together with coordinates of the second region in the omnidirectionally captured image. On the other hand, when the sixth input of touching the second thumbnail image 2830 corresponding to the second region and then dragging the second thumbnail image 2830 to the right is received in a state in which the second thumbnail image 2830 corresponding to the second region is displayed, the controller 180 may acquire an image corresponding to a third region 2930 moved right from the second region from the omnidirectionally captured image stored in the storage unit 170 and store the acquired image as shown in FIG. 29. Also, the controller 180 may display a thumbnail image corresponding to the third region 2930.

On the other hand, the controller 180 may receive the sixth input for the second thumbnail image 2830. The sixth input for the second thumbnail image 2830 may be an input for acquiring an image further including the region corresponding to the direction of the sixth input.

For example, the image corresponding to the second region may be stored in the storage unit 170 together with coordinates of the second region in the omnidirectionally captured image. On the other hand, when the sixth input of force-touching the second thumbnail image 2830 corresponding to the second region and then dragging the second thumbnail image 2830 to the right is received in a state in which the second thumbnail image 2830 corresponding to the second region is displayed, the controller 180 may acquire an image corresponding to a third region 2940 further including a right-side region of the second region from the omnidirectionally captured image stored in the storage unit 170 and store the acquired image as shown in FIG. 30. Also, the controller 180 may display a thumbnail image corresponding to the third region 2940.

When a general image is acquired, the user may want to modify a region included in the general image. An example may be a case where a user's figure is cut in an image. In this case, in accordance with the present disclosure, it is possible to provide an environment that can easily modify an image by using a previously generated general image without performing the process of acquiring the general image from the beginning.

FIGS. 31 to 34 are views for describing a method of displaying a panorama image and acquiring an image of a region desired by a user as a general image, in accordance with an embodiment of the present disclosure.

The controller 180 may receive a fourth input in a state in which a thumbnail image corresponding to a first region is displayed. The fourth input may be an input for displaying a thumbnail image of an entire region parallel to the first region.

Figure 31:
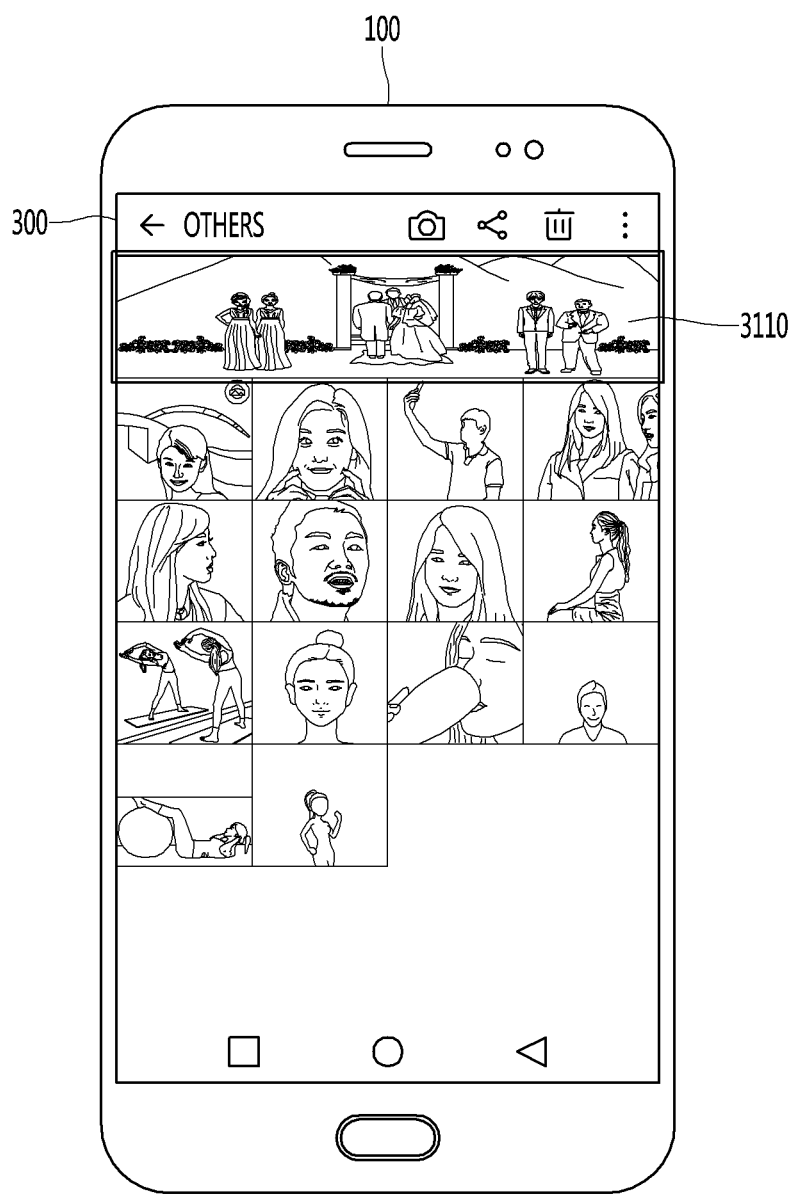
FIGS. 31 to 34 are views for describing a method of displaying a panorama image and acquiring an image of a region desired by a user as a general image, in accordance with an embodiment of the present disclosure.
Figure 32:
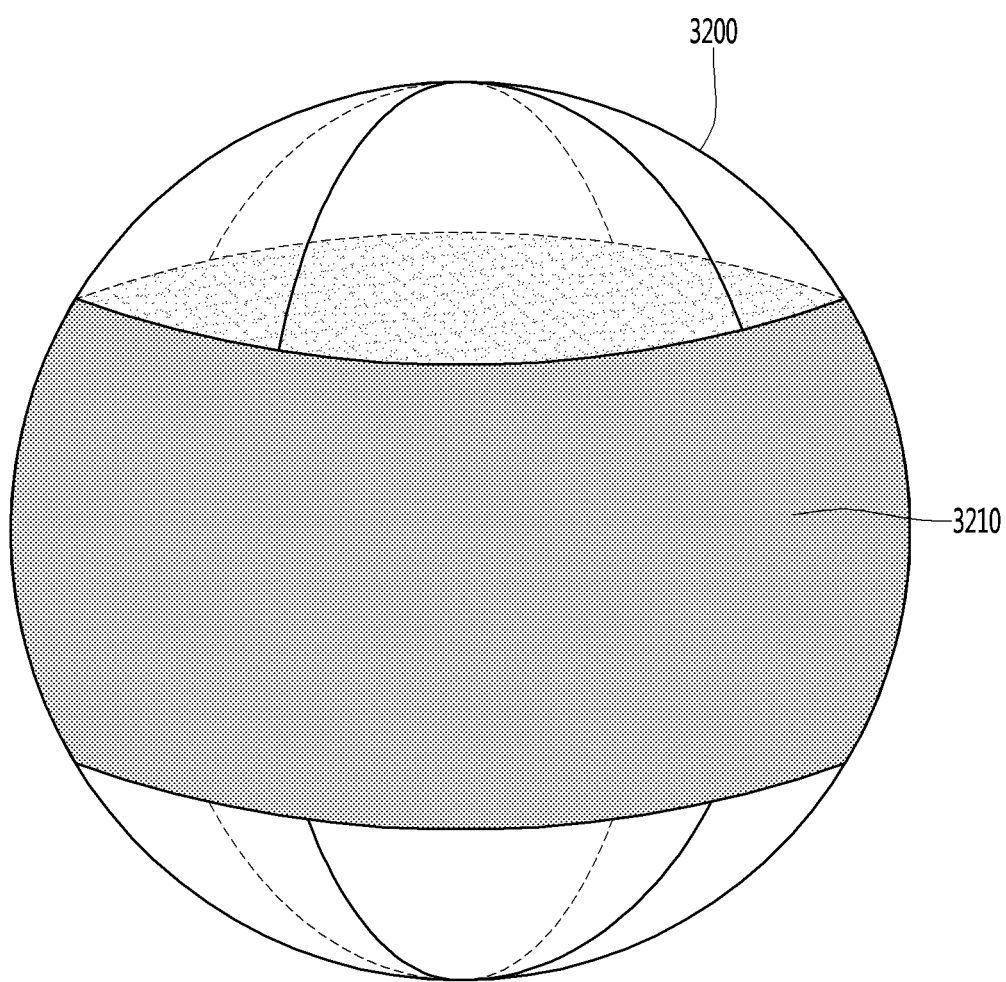

As shown in FIG. 31, when the fourth input is received, the controller 180 may display a thumbnail image 3110 corresponding to the entire region parallel to the first region. The entire region 3210 parallel to the first region is shown in FIG. 32.

The controller 180 may receive a fifth input in a state in which the thumbnail image 3110 of the entire region parallel to the first region is displayed. The fifth input may be an input for selecting a specific region of the entire region 3210 parallel to the first region.

Figure 33:
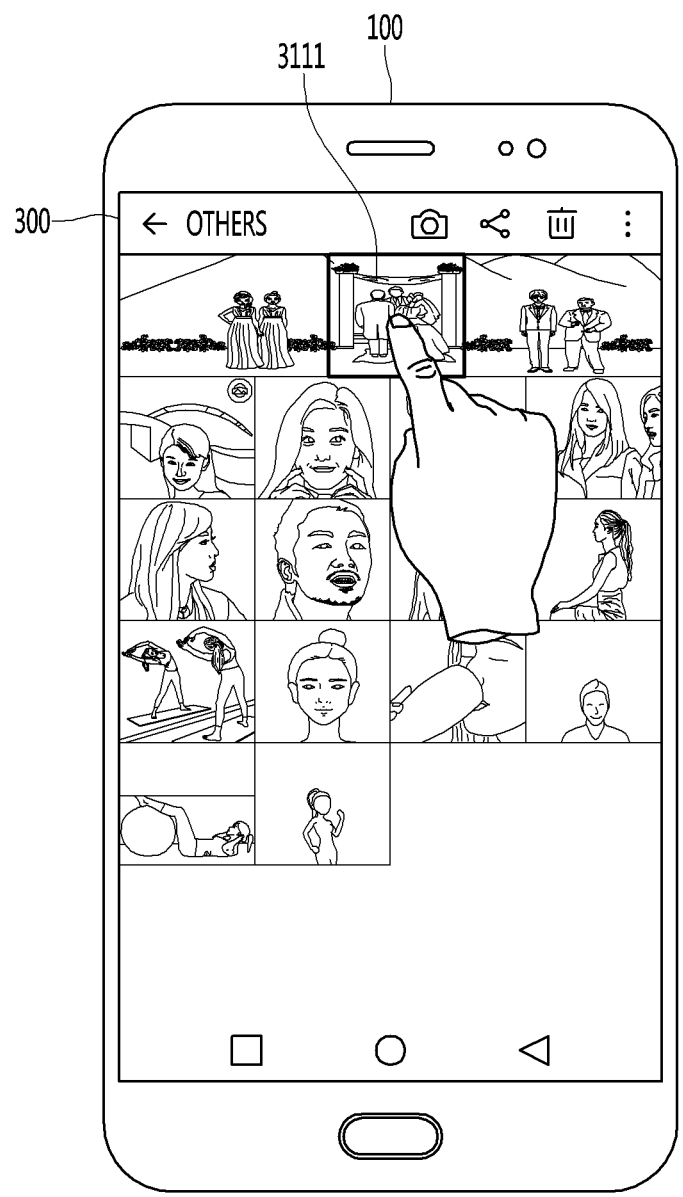
Figure 34:
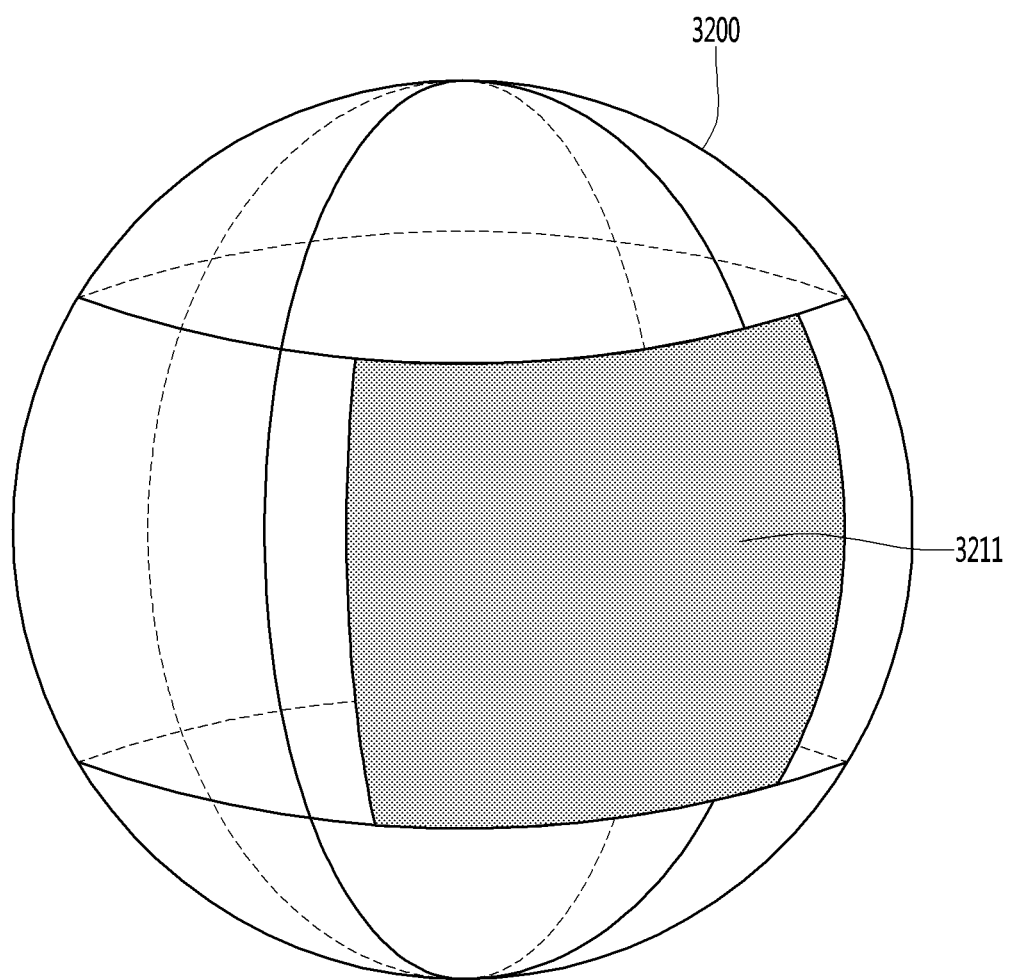

As shown in FIG. 33, when the fifth input is received, the controller 180 may acquire an image of a region 3211 corresponding to the region where the fifth input is received in the entire region 3210 parallel to the first region and store the acquired image in the storage unit 170. The region 3211 corresponding to the region where the fifth input is received is shown in FIG. 34.

On the other hand, when the fifth input is received, the controller 180 may display a thumbnail image of the region 3211 corresponding to the region where the fifth input is received.

As such, in accordance with the present disclosure, the panorama image is provided and the image of the region selected by the user is acquired as the general image, thereby allowing the user to select a region that the user wants to treasure as the general image while viewing the panorama image.

Figure 35:
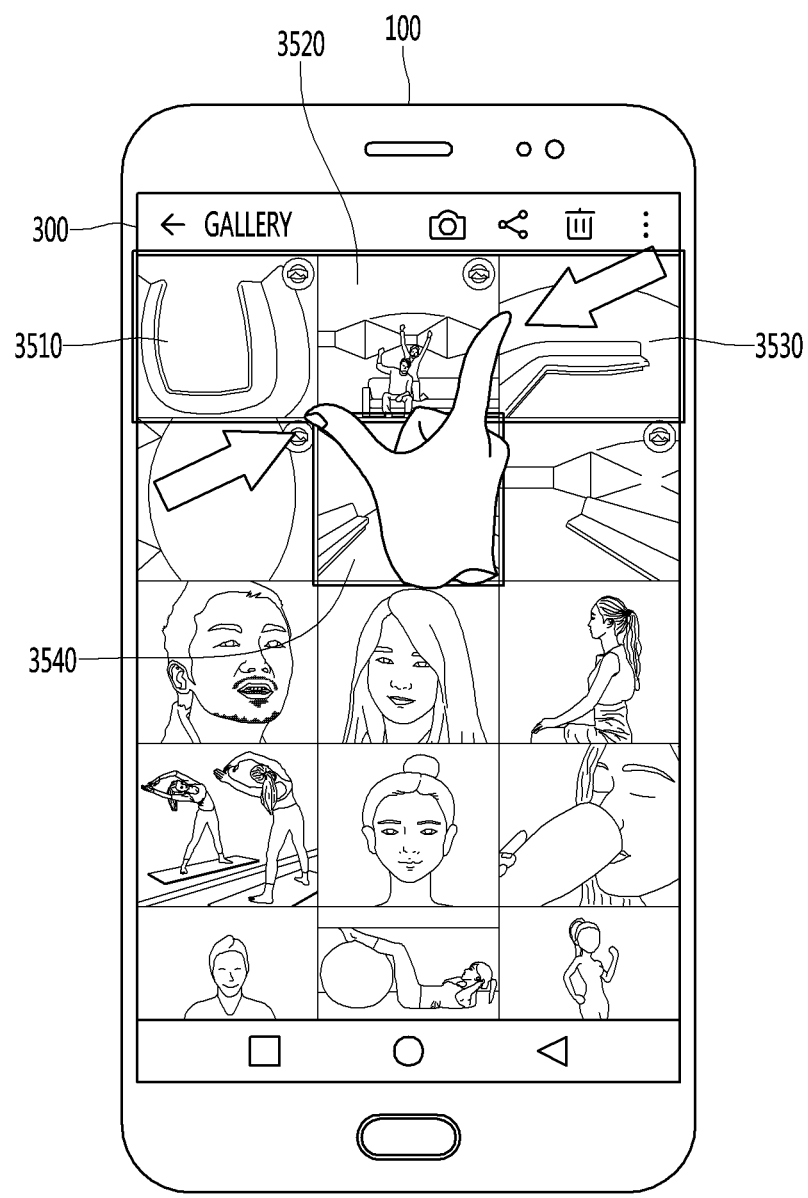
FIGS. 35 and 36 are views for describing a method of deleting one or more thumbnail images, in accordance with an embodiment of the present disclosure.
Figure 36:
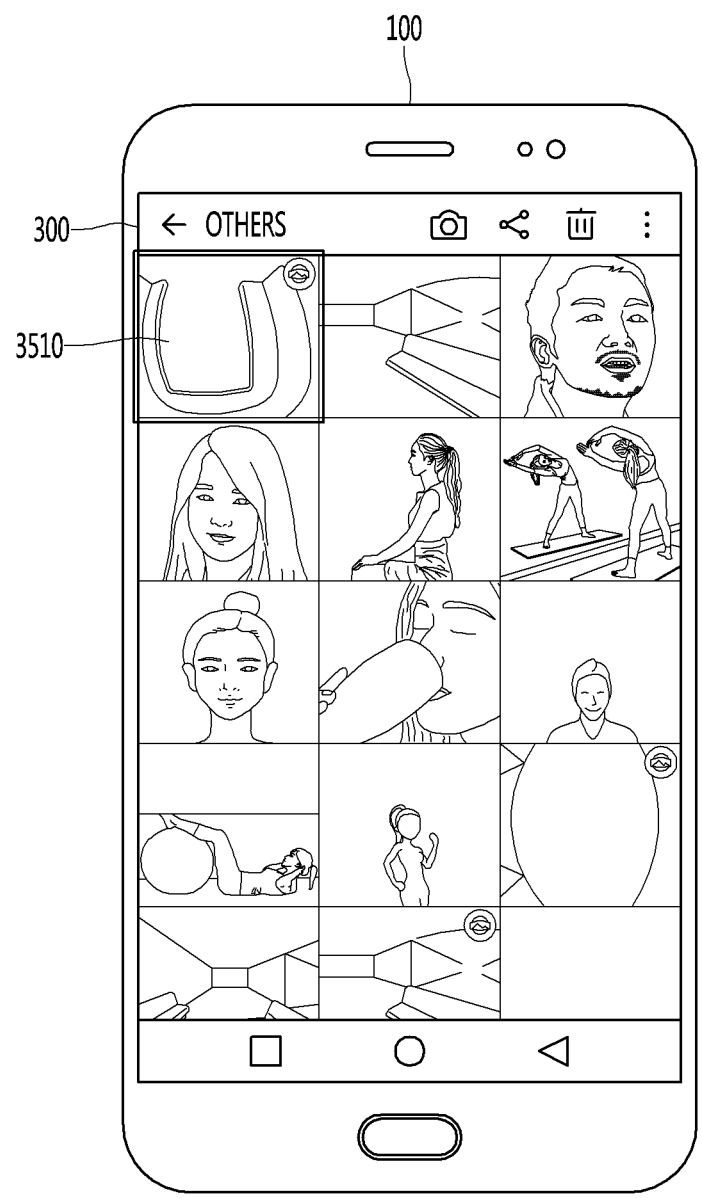

FIGS. 35 and 36 are views for describing a method of deleting one or more thumbnail images, in accordance with an embodiment of the present disclosure.

In the above-described embodiments, it is assumed that, when an input is received in a state in which a thumbnail image corresponding to a first region of an omnidirectionally captured image is displayed, the one or more thumbnail images respectively corresponding to the one or more images different from the first region of the omnidirectionally captured image are displayed.

On the other hand, when an input of selecting a specific image of one or more thumbnail images is received in a state in which the thumbnail image 3510 corresponding to the first region and one or more thumbnail images 3520, 3530, and 3540 respectively corresponding to one or more regions different from the first region are displayed, the controller 180 may store an image corresponding to the selected thumbnail image in the storage unit 170. Also, the controller 180 may display the image corresponding to the selected thumbnail image in the normal mode.

Also, when an input of selecting the thumbnail image 3510 corresponding to the first region is received in a state in which the thumbnail image 3510 corresponding to the first region and the one or more thumbnail images 3520, 3530, and 3540 respectively corresponding to the one or more regions different from the first region are displayed, the controller 180 may display the image corresponding to the first region in the omnidirectional display mode.

On the other hand, when a seventh input is received in a state in which the thumbnail image 3510 corresponding to the first region and the one or more thumbnail images 3520, 3530, and 3540 respectively corresponding to the one or more regions different from the first region are displayed, the controller 180 may stop the displaying of the one or more thumbnail images 3520, 3530, and 3540 and display the thumbnail image 3510 corresponding to the first region as shown in FIG. 36.

The seventh input may be a pinch-in input for a region where the thumbnail image corresponding to the first region and the one or more thumbnail images 3520, 3530, and 3540 respectively corresponding to the one or more regions different from the first region are displayed.

As such, in accordance with the present disclosure, it is possible to provide an environment in which a user checking the thumbnail images of various directions of the omnidirectionally captured image can return back to the previous image.

Figure 37:
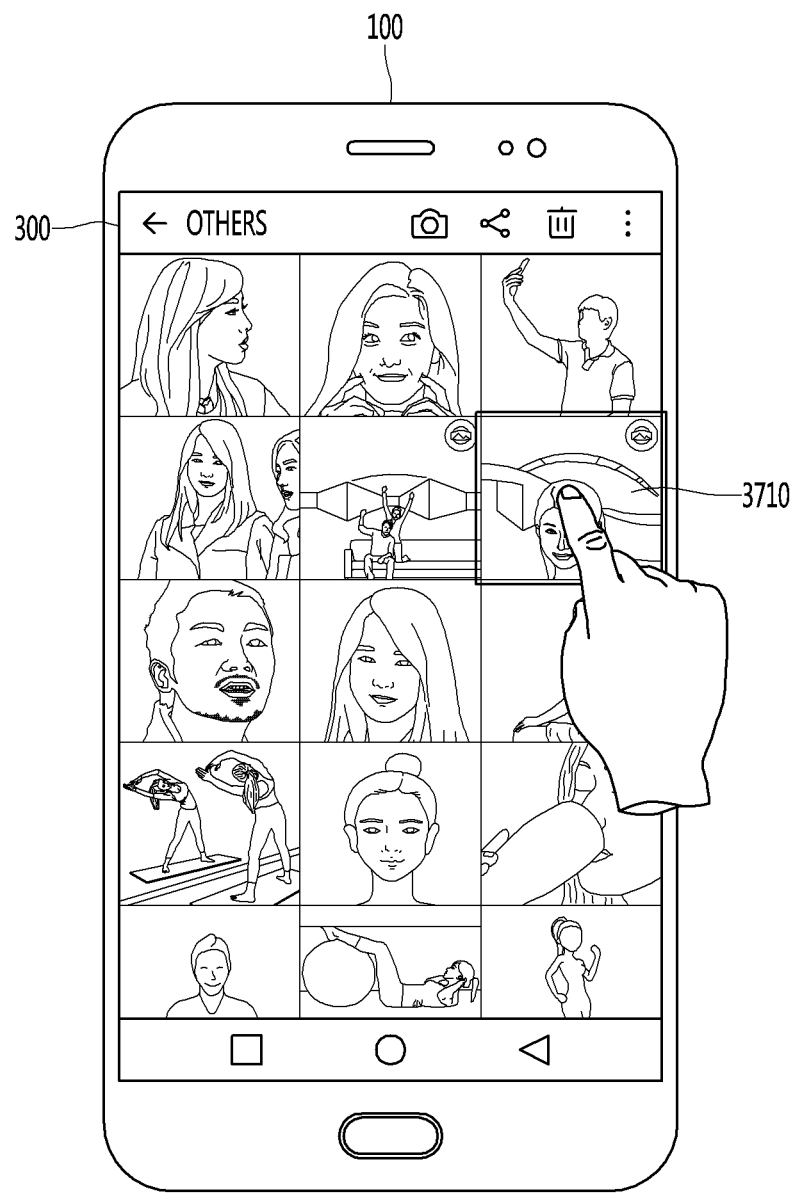
FIGS. 37 and 38 are views for describing a method of generating a general image matching a user's intention, in accordance with an embodiment of the present disclosure.
Figure 38:
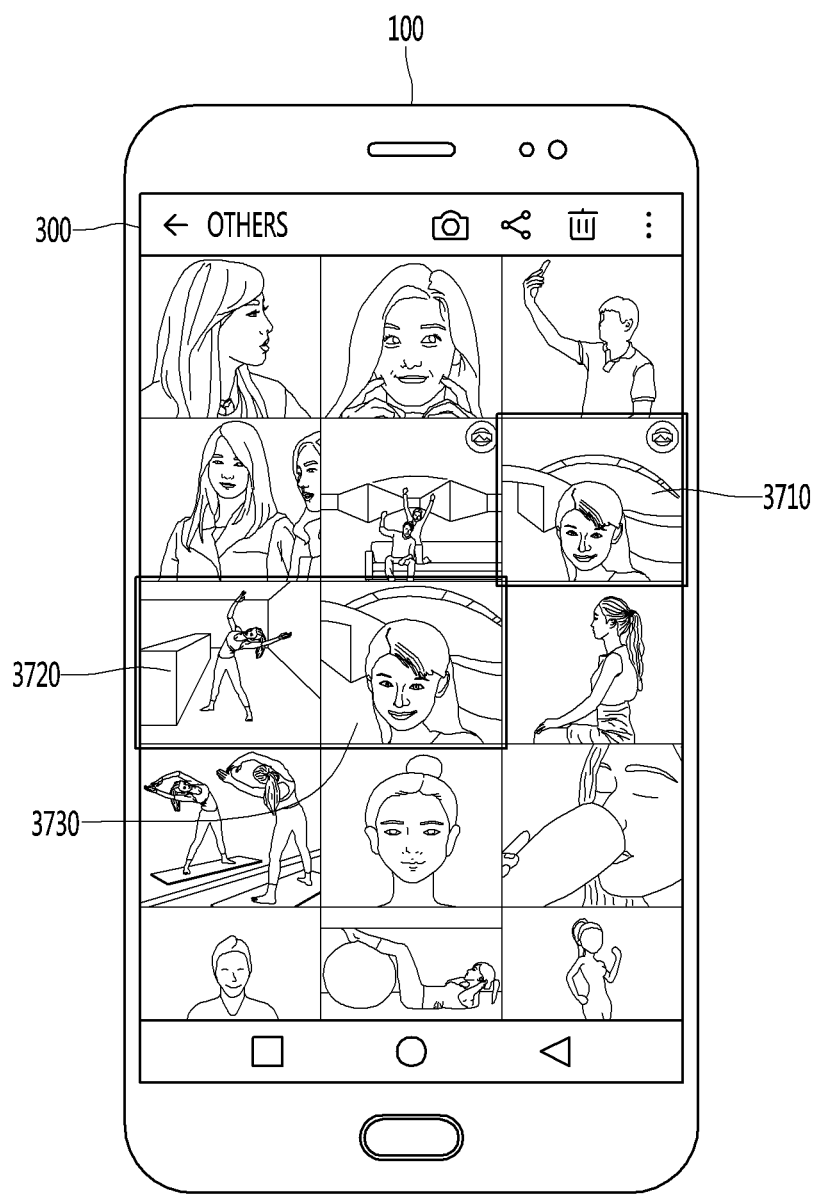

FIGS. 37 and 38 are views for describing a method of generating a general image matching a user's intention, in accordance with an embodiment of the present disclosure.

The controller 180 may receive an input of selecting a thumbnail image 3710 of a first region in a state in which the thumbnail image 3710 of the first region is displayed. The input of selecting the thumbnail image 3710 of the first region may be an input of long-pressing the thumbnail image 3710 of the first region.

On the other hand, when the input of long-pressing the thumbnail image 3710 of the first region, the controller 180 may acquire one or more images including a specific type of an object from an omnidirectionally captured image.

Specifically, when the input of selecting the thumbnail image 3710 of the first region is received in a state in which the thumbnail image 3710 of the first region of the omnidirectionally captured image is displayed as shown in FIG.

37, the controller 180 may display thumbnail images 3720 and 3730 respectively corresponding to one or more regions different from the first region of the omnidirectionally captured image as shown in FIG. 38. The thumbnail images 3720 and 3730 respectively corresponding to the one or more regions different from the first region may be a thumbnail image including the specific type of the object.

For example, when the specific type of the object is a person and the omnidirectionally captured image includes one or more persons, the controller 180 may acquire one or more images including at least one person among the one or more persons. In this case, the controller 180 may store the one or more images in the storage unit 170. Also, the controller 180 may display the one or more thumbnail images 3720 respectively corresponding to the one or more images.

On the other hand, the specific type of the object may be determined by an input received from a user. Specifically, when an input of selecting a specific region of the thumbnail image 2710 of the first region is received in a state in which the thumbnail image 3710 of the first region of the omnidirectionally captured image is displayed, the controller 180 may display one or more thumbnail images including a type of an object located in the specific region. For example, when a person is located in the specific region of the thumbnail image 3710 of the first region, the controller 180 may display one or more thumbnail images including the person. As another example, when a window is located in the specific region of the thumbnail image 3710 of the first region, the controller 180 may display one or more thumbnail images including the window.

As such, in accordance with the present disclosure, it is possible to provide an environment that stores an image matching a user's intention as a general image.

On the other hand, the controller 180 is generally a component that manages the control of the apparatus and may also be referred to as a central processing unit, a microprocessor, a processor, and the like.

The present invention mentioned in the foregoing description may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A display apparatus comprising:
    a display unit configured to display an image;
    an input unit configured to receive an input from a user; and
    a controller configured to control the display unit to display a gallery including a thumbnail image corresponding to a first region of an omnidirectionally captured image and to additionally display, in response to the input, one or more thumbnail images respectively corresponding to one or more regions which are different from the first region in the omnidirectionally captured image, in the gallery,
    wherein, if the input is a first type input, the controller is configured to control the display unit to display one or more thumbnail images respectively corresponding to one or more regions in a same horizontal plane of the omnidirectionally captured image as the first region, and
    wherein, if the input is a second type input, the controller is configured to control the display unit to display one or more thumbnail images respectively corresponding to one or more regions in a same vertical plane of the omnidirectionally captured image as the first region.

2. The display apparatus of claim 1, wherein the controller is configured to control the display unit to display the gallery including the thumbnail image corresponding to the first region of the omnidirectionally captured image and a thumbnail image of a general image.

3. The display apparatus of claim 2, wherein the controller is configured to control the display unit to display the thumbnail image corresponding to the first region and the one or more thumbnail images in a same row or column within the gallery, and
    wherein the controller is configured to change a number of thumbnail images displayed in the same row, so that the thumbnail image corresponding to the first region and the one or more thumbnail images are displayed in the same row, or to change a number of thumbnail images displayed in a same column, so that the thumbnail image corresponding to the first region and the one or more thumbnail images are displayed in the same column.

4. The display apparatus of claim 2, wherein the thumbnail image corresponding to the first region and the one or more thumbnail images are aligned within the gallery.

5. The display apparatus of claim 2, wherein, if the one or more thumbnail images are images respectively corresponding to the one or more regions in the same horizontal plane of the omnidirectionally captured image as the first region, the controller is configured to control the display unit to display the one or more thumbnail images in a same row as the thumbnail image corresponding to the first region,
    wherein if the one or more thumbnail images are images respectively corresponding to the one or more regions in the same vertical plane of the omnidirectionally captured image as the first region, the controller is configured to control the display unit to display the one or more thumbnail images in a same column as the thumbnail image corresponding to the first region, and
    wherein if the one or more thumbnail images are images respectively corresponding to the one or more regions in the same horizontal plane of the omnidirectionally captured image as the first region and the one or more regions in the same vertical plane of the omnidirectionally captured image as the first region, the controller is configured to control the display unit to display the thumbnail images respectively corresponding to the one or more regions in the same horizontal plane of the omnidirectionally captured image as the first region in the same row as the thumbnail image corresponding to the first region and to display the thumbnail images respectively corresponding to the one or more regions in the same vertical plane of the omnidirectionally captured image as the first region in the same column as the thumbnail image corresponding to the first region.

6. The display apparatus of claim 1, wherein, when an eighth type input is received from the user, the controller is configured to change the thumbnail image corresponding to the first region of the omnidirectionally captured image to a thumbnail image corresponding to a second region of the omnidirectionally captured image and to display the changed thumbnail image, and
wherein the second region of the omnidirectionally captured image is a region rotated from the first region in a direction in which the eighth type input is made or a region moved with regard to the first region in a direction in which the eighth type input is made.

7. The display apparatus of claim 6, wherein, if an input for displaying the omnidirectionally captured image in an omnidirectionally display mode is received, the controller is configured to control the display unit to display an image corresponding to the second region of the omnidirectionally captured image, and
wherein if an input for displaying a region different from the second region is received when the image corresponding to the second region is displayed, the controller is configured to control the display unit to display an image of the region different from the second region.

8. The display apparatus of claim 6, wherein, if an input of selecting the thumbnail image corresponding to the first region is received when the thumbnail image corresponding to the first region is displayed, the controller displays the image corresponding to the first region of the omnidirectionally captured image in an omnidirectional display mode, and
wherein if an input of selecting the thumbnail image corresponding to the second region is received when the thumbnail image corresponding to the second region is displayed, the controller displays the image corresponding to the second region in the omnidirectional display mode.

9. The display apparatus of claim 1,
wherein, if the input is a third type input, the controller is configured to control the display unit to display a plurality of thumbnail images respectively corresponding to one or more regions in the same horizontal plane of the omnidirectionally captured image as the first region and one or more regions in the same vertical plane of the omnidirectionally captured image as the first region.

10. The display apparatus of claim 1, wherein the thumbnail image corresponding to the first region is an image that represents an angle range of a specific angle of view in the omnidirectionally captured image, and
wherein the one or more thumbnail images respectively corresponding to the one or more regions each are images that represent an angle range of a same angle of view as the specific angle of view.

11. The display apparatus of claim 1, wherein the controller is configured to display the one or more thumbnail images respectively corresponding to the one or more regions based on a speed of the input, such that an angle of view of the one or more thumbnail images is dependent on the speed of the input.

12. The display apparatus of claim 1, wherein, when a fourth type input is received from the user, the controller is configured to control the display unit to display a thumbnail image corresponding to a 360 degree panorama image showing an entire region in the same horizontal plane of the omnidirectionally captured image as the first region, and
when a fifth type input is received from the user, the controller is configured to display an image of a region corresponding to a region where the fifth type input is received in the entire region in the same horizontal plane of the omnidirectionally captured image as the first region.

13. The display apparatus of claim 12, wherein the one or more thumbnail images include a second thumbnail image corresponding to a second region which is different from the first region, and
when a sixth type input for the second thumbnail image is received, the controller is configured to control the display unit to display the second thumbnail image further including a region corresponding to a direction of the omnidirectionally captured image in which the sixth type input is made.

14. The display apparatus of claim 1, wherein, if the input is received, the controller is configured to control the display unit to display the thumbnail image corresponding to the first region and the one or more thumbnail images, and
wherein if a seventh type input is received when the thumbnail image corresponding to the first region and the one or more thumbnail images are displayed, the controller is configured to stop the displaying of the one or more thumbnail images and to display the thumbnail image corresponding to the first region.

15. The display apparatus of claim 1, wherein the omnidirectionally captured image includes one or more persons, and
wherein the one or more thumbnail images respectively include at least one person among the one or more persons.

16. The display apparatus of claim 1, wherein, if a ninth type input is received when the one or more thumbnail images are displayed, the controller stops the displaying of the one or more thumbnail images and displays the thumbnail image corresponding to the first region.

17. The display apparatus of claim 16, wherein the input is a pinch-out input, and the ninth type input is a pinch-in input.

* * * * *